United States Patent [19]

Hasebe et al.

[11] Patent Number: 4,920,482

[45] Date of Patent: Apr. 24, 1990

[54] MULTIPLE MODE MICROPROGRAM CONTROLLER

[75] Inventors: Atsushi Hasebe, Kangawa, Japan; Ryohei Kato, College Park, Md.

[73] Assignee: Sony Corporation, Tokyo, Japan

[21] Appl. No.: 932,277

[22] Filed: Nov. 19, 1986

[30] Foreign Application Priority Data

Nov. 19, 1985 [JP] Japan ............................ 60-259543

[51] Int. Cl.⁵ .......................... G06F 9/24; G06F 9/26
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,478,322 | 11/1969 | Evans | 364/200 |
| 3,972,025 | 7/1976 | Taddei | 364/200 |
| 4,001,788 | 1/1977 | Patterson et al. | |
| 4,021,651 | 5/1977 | Mitsuhashi et al. | 364/900 X |
| 4,095,270 | 6/1978 | Blum et al. | 364/200 |
| 4,167,779 | 9/1979 | Sullivan et al. | 364/200 |
| 4,179,735 | 12/1979 | Lodi | 364/200 |
| 4,204,252 | 5/1980 | Hitz et al. | |
| 4,422,144 | 12/1983 | Johnson et al. | 364/200 |
| 4,641,238 | 2/1987 | Kneib | 364/200 |

FOREIGN PATENT DOCUMENTS

| | | |
|---|---|---|
| 42988 | 6/1981 | European Pat. Off. |
| 100140 | 6/1983 | European Pat. Off. |
| 073419 | 9/1983 | European Pat. Off. |
| 106213 | 9/1983 | European Pat. Off. |
| 195823 | 9/1985 | European Pat. Off. |
| 215455 | 9/1986 | European Pat. Off. |
| 1452015 | 9/1974 | United Kingdom |
| 1455160 | 11/1974 | United Kingdom |
| 1491804 | 1/1975 | United Kingdom |
| 1556256 | 3/1977 | United Kingdom |
| 1548497 | 4/1977 | United Kingdom |
| 2127997 | 9/1983 | United Kingdom |
| 2162346 | 5/1985 | United Kingdom |

OTHER PUBLICATIONS

Electronic Design Magazine, 33(1985) Jan., No. 1, Hasbrouck Heights, New Jersey, pp. 319-328.

Primary Examiner—David L. Clark
Attorney, Agent, or Firm—Lewis H. Eslinger; Jay H. Maioli

[57] ABSTRACT

An information processing apparatus comprising a program supplying portion, write signal generator, and a data processor, which includes a microprogram controller, microprogram memory, arithmetic unit, and a selector for selecting in an alternative way an address from the microprogram controller and an address from the program supplying portion and supplying the same to the microprogram memory. In the apparatus, it is adapted such that, in a first (program execution) mode, the address from the microprogram controller is supplied through the selector to the microprogram memory, in a second (reset, or stop) mode, the microprogram controller is supplied with a signal, whereby the same is caused to continuously generate program start addresses, and in a third (program transfer) mode, the address from the program supplying portion is supplied through the selector means to the microprogram memory and, according to a write signal from the write signal generator, the program from the program supplying portion is written in the microprogram memory.

When supplying a plurality of different programs from the program supplying portion to the processors operating under the program, such a method can be used to treat the whole of the plurality of different programs as one program and supply this program to the processors at one time of transfer and separately supply an execution start address of one program out of the plurality of different programs to each of said processors.

7 Claims, 14 Drawing Sheets

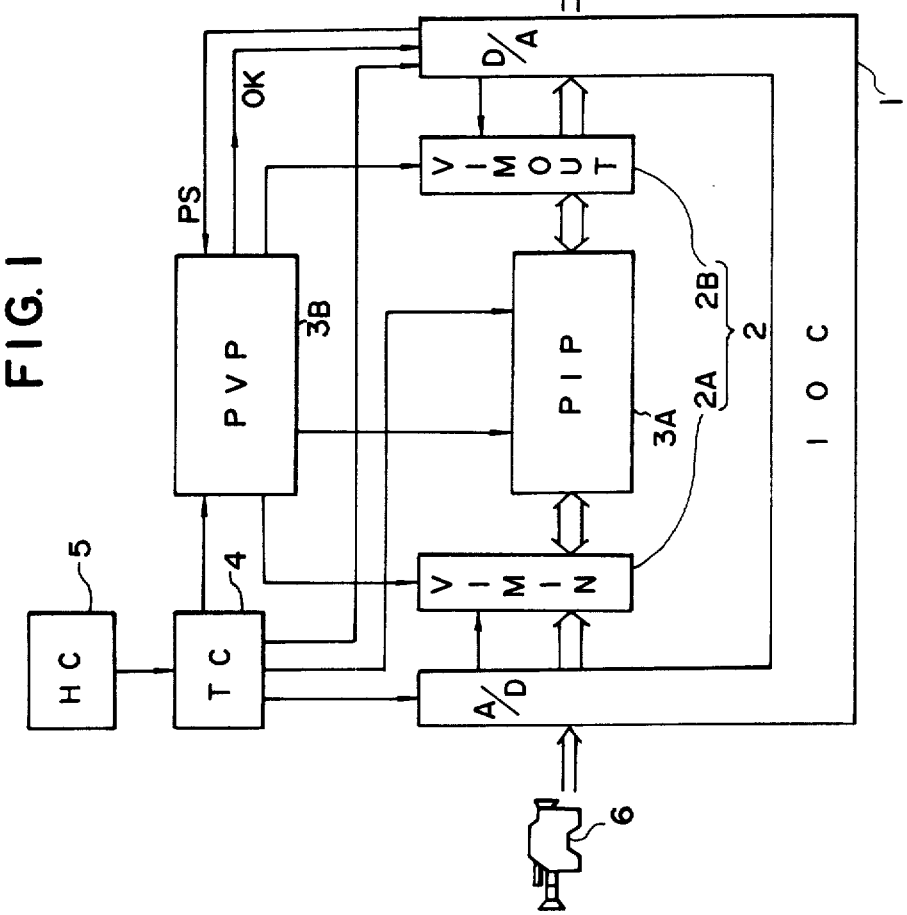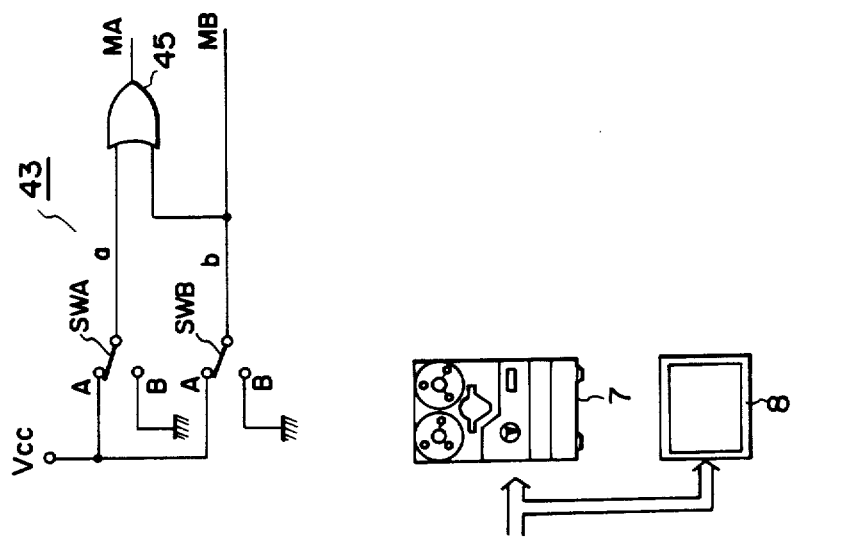

| ADDRESS | CONTENTS | | | | |
|---|---|---|---|---|---|
| | PARAMETER | PROCESSOR SELECTION | ADDRESS DATA | PROGRAM CONTENTS | WRITE SIGNAL |
| 0 | ○ ○ ○ | 10 | 0 | X X X X | 0 |
| 1 | ○ ○ ○ | 10 | 1 | X X X X | 0 |
| 2 | ○ ○ ○ | 10 | 2 | X X X X | 0 |
| ⋮ | ⋮ | ⋮ | ⋮ | ⋮ | ⋮ |
| 7 | ○ ○ ○ | 10 | 7 | X X X X | 0 |
| 8 | △ △ △ | 25 | 0 | X X X X | 0 |
| 9 | △ △ △ | 25 | 1 | X X X X | 0 |
| ⋮ | ⋮ | ⋮ | ⋮ | ⋮ | ⋮ |
| 23 | △ △ △ | 25 | 15 | X X X X | 0 |

FIG. 14

| ADRS ADDRESS | DATA PROGRAM CONTENTS |
|---|---|
| ⬚0⬚ | 0 1 0 0 1 0 ----- 0 |
| 1 | 0 1 1 0 0 1 ----- 0 |
| 2 | 1 0 1 1 0 1 ----- 1 |
| 3 | |
| 4 | |
| 5 | |
| ⬚6⬚ | 1 0 1 1 0 ----- 1 |
| 7 | 1 1 0 1 1 ----- 1 |
| ⋮ | |
| 18 | 0 1 0 1 1 0 ----- 0 |
| ⬚19⬚ | 1 0 1 0 1 0 ----- 0 |
| 20 | |
| ⋮ | |
| 28 | 1 1 1 0 1 0 ----- 0 |

1ST PROGRAM: addresses 0–5
2ND PROGRAM: addresses 6–18
3RD PROGRAM: addresses 19–28

MULTIPLE MODE MICROPROGRAM CONTROLLER

BACKGROUND OF THE INVENTION

The present invention relates a method and an apparatus for data transfer.

An information processing apparatus so far proposed, for example, a video image processing system (such as that disclosed in Treatises of Institute of Electronics and Communication Engineers of Japan 85/4 Vol. J68-D No. 4 and Japanese Patent Laid-open No. 58-215813) is provided with a plurality of processors, and the microprograms as the contents of the microprogram memories therein are adapted to be exchanged when scope of processing is enlarged. In such a case, the microprograms are supplied from a program supplying portion which in general is formed of a host computer to each of the processors, and it is adapted, for example, such that microprograms are exchanged on request of a user effected by his turning on a switch.

When a plurality of short programs are to be sequentially executed by a processor, for example, it is a general practice that the programs are sent one by one to the processor each time one program has been executed.

If there are a plurality of data processors and different programs are to be transferred to the plurality of processors, it is generally practiced that the processor to which a program is to be transferred is selected for each program to be transferred.

When such a transfer system was adopted that a plurality of short programs were to be sequentially sent to a processor for execution, the transfers had to be repeated the same number of times as the number of the programs there were and a large portions of the processing time was taken for the transferring, and so, there was such a defect that the processing speed as a whole was reduced considerably.

And, when the systems was such that a plurality of different programs were to be transferred to a plurality of processors and the processors were to be selected for each program to be transferred thereto, it was necessary to provide an arrangement for selection control of the processors, and so, there was such a defect that the circuit became rather complex and large in scale to meet such transferring requirement.

OBJECT OF THE INVENTION

A primary object of the present invention is the provision of an information processing apparatus capable of an functioning in a number of modes selected by the user in which the various modes have different corresponding programs that are selectively applied to a data processor of the apparatus.

BRIEF DESCRIPTION OF THE DRAWINGS

FIG. 1 is a conceptual drawing showing the whole of an image processing apparatus to which the data transfer apparatus of the present invention is applied;

FIG. 3 is a circuit diagram showing an example of structure of a portion of FIG. 2;

FIG. 14 is a drawing showing an example of a program to be transferred by the arrangement of FIG. 13.

DETAILED DESCRIPTION OF THE PREFERRED EMBODIMENTS

Figure 2:
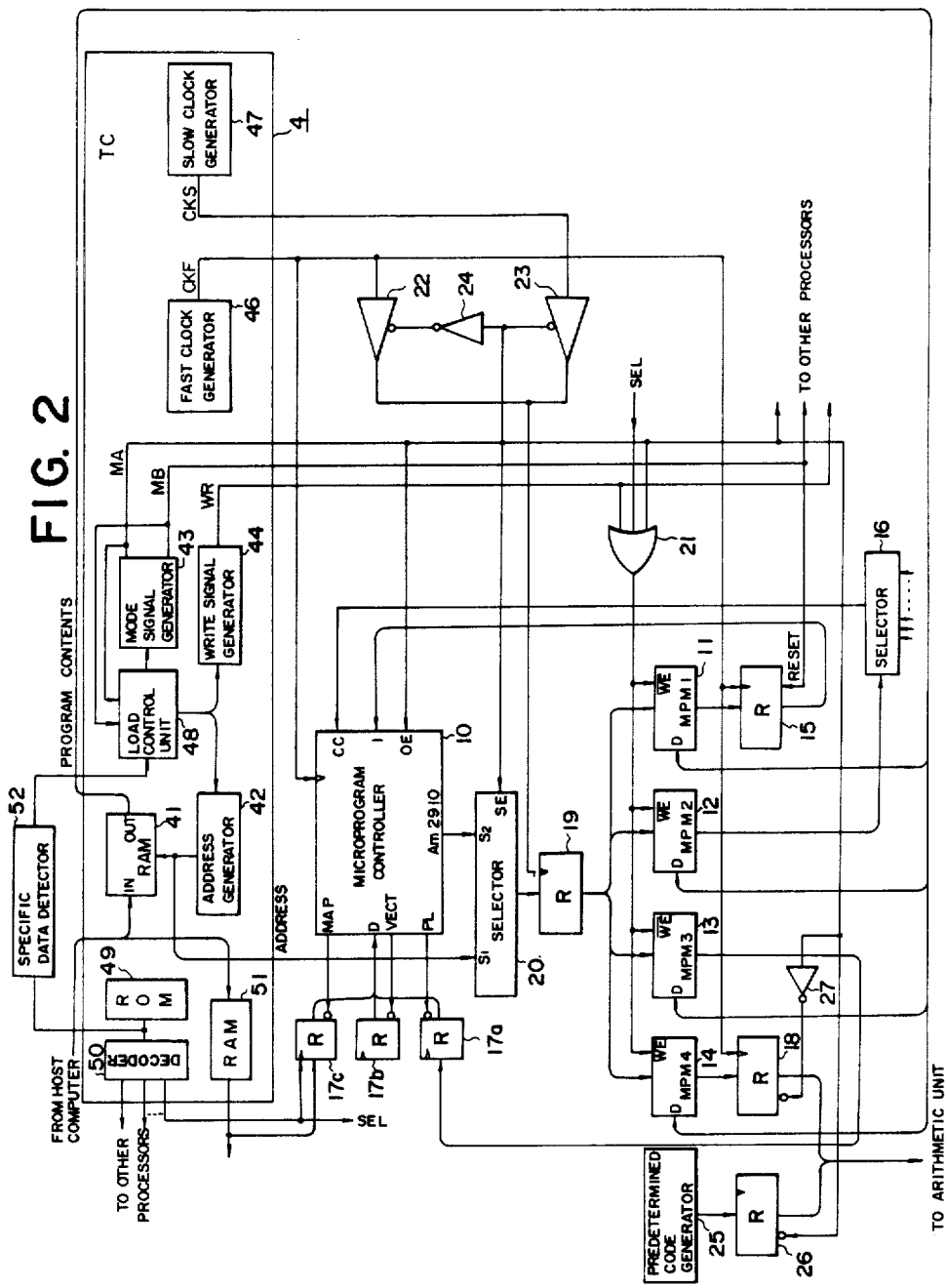
FIG. 2 is a block diagram showing an example of the main portion of the image processing apparatus of FIG. 1.

An embodiment of the present invention applied to a video image processing system will be described in the following with reference to the accompanying drawings.

The example of a video image processing apparatus as shown in FIG. 1 is provided for achieving high-speed data processing, and the same comprises an input/output portion 1 (hereinafter to be called an IOC), a memory portion 2 (hereinafter to be called a VIM) consisting of an input image memory 2A (hereinafter to be called a VIMIN) and an output image memory 2B (hereinafter to be called a VIMOUT), a data processing portion 3 consisting of a position stationary processor system 3A (hereinafter to be called a PIP) for chiefly calculating picture element values and a position variant processor system 3B (hereinafter to be called a PVP) for controlling data flows such as controlling of addresses and for adjusting processes to coincide in timing, and a processor 4 (hereinafter to be called a TC) as a total controller for controlling execution and stopping of processes and exchange of programs. The TC 4 is provided with a host computer 5 (hereinafter to be called an HC) for controlling the entire video image processing apparatus.

The IOC 1 makes A/D conversion of video signals coming from a video camera of VTR, for example, to provide digital image data and writes the same in the VIMIN 2A, and also, reads out processed image data from the VIMOUT 2B and makes D/A conversion of the same to restore analog video signals, so that they may, for example, be recorded in a VTR 7 or supplied to a monitor receiver 8 for enabling monitoring of the video image to be made.

In the present case, the signals enabled to be input and output are the video signals of the NTSC system or the R-G-B system, and either of these systems is specified by the TC 4. And, a picture element is provided, for example, by 8-bit data.

The writing and reading image in and out of the VIM 2 is performed in one lump of the image data, namely, in blocks of a field or a frame. Therefore, each of the VIMIN 2A and the VIMOUT 2B is made up of a plurality of sheets of memories, each having capacity for the image data of a field or a frame of, for example, 12 sheets of 768×512 bytes of frame memories. In the case of the present example, the use of these 12 sheets of frame memories is not fixed but adapted to be flexibly allotted to either of the VIMIN 2A and the VIMOUT 2B according to the purpose of the processing or the picture image as the object of the processing. And, the memory is adapted such that two sheets are used as one set, namely, when one sheet is enabled to be written, the other sheet is enabled to be read, whereby it is made possible that the processing from outside the VIM 2 by the IOC 1 and the processing within the VIM 2 by the PIP 3A and the PVP 3B are performed in parallel.

In the present case, the control mode signal determining whether the plurality sheets of frame memories of VIM 2 should come under the control of the IOC 1 or under the control of the PVP 3B is issued from the IOC 1 and supplied to the VIM 2.

The data processing portion 3 comprises a processor that reads image data stored in the VIMIN 2A according to its program, processes the data various ways, and writes the processed data in VIMOUT 2B.

The data processing portion 3 is made up of separated systems of the PIP 3A and the PVP 3B, and by virtue of such separated arrangement, the processing time to be consumed in the data processing portion is determined only by whichever is longer of the processing times taken by both the systems, while it was determined by the sum of the processing times in the prior art data processing portion. Therefore, in the case of the present example, such high-speed processing is achievable as the processing of video data can be performed on a real time basis.

The processor of the data processing portion 3 is made up of one sheet or a plural sheets of processors and the microprograms as the contents of their microprogram memories are adapted to be exchanged when the scope of the processing is enlarged.

The program exchange is carried out in this way: the microprograms are supplied from the HC 5 to the TC 4 in advance and stored, for example, in a RAM provided therein, and thereafter, when, for example, the user has made a request for exchanging some programs (by turning a switch on), the TC 4 supplies the programs to each of the processors.

The PIP 3A and the PVP 3B are basically of the same architecture being an independent processor comprising a control unit, arithmetic unit, memory unit, and input/output port. Each thereof is arranged in a multiprocessor structure made up of a plurality of unit processors and it is adapted such that high-speed processing is achieved chiefly by adoption of a parallel processing system.

The PIP 3A comprises, for example, 60 sheets of PIP processors and several sheets of subprocessors and processes image data coming from the VIM 2 or generates image data within the PIP 3A itself.

The PVP 3B comprises, for example, 30 sheets or so of processors and controls flows of image data inward of the VIM 2 such as allotment of the picture element data to the PIP 3A or collection.

Namely, the PVP 3B generates address data and control signals for the VIM 2 and supplies these to the VIM 2, and also, generates input/output control signals and other control signals for the PIP 3A and supplies these to the PIP 3A.

The image data processing is not always conducted in such a manner that the data from a sheet of frame of the VIMIN 2A are processed and the processed data are written in the VIMOUT 2B, but sometimes such data coming from a plural sheets of frame memories and extending over a plural sheets of frames are processed.

The number of digits for arithmetic processing in the PIP 3A and PVP 3B is 16-bit as a standard and such a processing speed is achievable in the arithmetic processing of image data that will process image data of one frame within one frame, namely, that will enable real-time processing. As a matter of course, there are also such processes that require longer processing time than one frame.

In the present case, the image data processing by the PIP 3A and PVP 3B is performed in synchronism with the frame. Therefore, a process start timing signal PS in synchronism with the frame is supplied from IOC 1 to the PVP 3B. The signal PS is ordinarily at a high level and it is brought to a low level at the processing start timing. On the other hand, a signal OK indicating that a process has been finished is supplied from the PVP 3B to the IOC 1. This signal OK is output from a processor at the core of the PVP 3B, the processor performing timing control of the processors of the processing system in the processors of the PVP 3B, when a process has been finished. The process start timing signal PS is generated in the IOC 1 based on a frame start signal indicating the first line of each frame and the process end signal OK.

When the processing is performed on a real time basis, since the signal OK is always obtained at the end of each frame, the signal PS becomes the same signal as the frame start signal FL.

On the other hand, when the processing time is longer than one frame, the signal PS does not concur with the frame period but is obtained at the start of a frame after a signal OK has been output.

And, when it is detected by the processor at the core of the PVP 3B dependent on a program that the process start timing signal PS from the IOC 1 has been brought to the low level, this processor starts to run, and outputs, according to the program, timing signals to other processors (inclusive of the PIP 3A), supplies addresses to the VIM 2, reads the image data from the VIM 2 and allows the same to be processed in the PIP 3A similarly, when the processing has been finished, outputs the signal OK and stops, waiting for issuance of the next process start timing signal PS.

In this case, only the image signal portion, excluding the synchronizing signal or burst signal, is taken as the object of processing and the data read out from the VIM 2 does not include the synchronizing signal and burst signal. Therefore, the IOC 1 is provided with a ROM generating the synchronizing signal, burst signal, and the vertical blanking signal, and in the case of the NTSC signal, the data from the VIMOUT 2B (after being rearranged, if necessary) are transferred to the D/A converter together with such synchronizing signal, burst signal, and vertical blanking signal.

Also in the case of the three primary color signal, an outer synchronizing signal becomes necessary. This signal is generated also in the IOC 1 and supplied to the monitor and others.

In the above parallel processing system by the use of multiprocessors, the TC 4 makes synthetic control according to the below mentioned three modes, and thereby, execution of processes, stopping, and program transfer (exchange) are carried out consistently, and also, the transfer and execution are effectively conducted by using a slow clock and a fast clock at the times of the program transfer and the program execution, respectively.

FIG. 2 is a drawing showing connections between the control unit of one of the plurality of processors which constitute the PIP 3A or PVP 3B and the TC 4 and the structure is common to all of the processors of which programs are exchanged.

That is, the portion in the drawing other than the TC 4 shows an example of the structure of the control unit of the processor. A microprogram controller 10 generates addresses of microprogram memories 11-14 formed of RAMS.

The microprogram memory 11 provides an instruction bit, for example, of 4-bit for selecting one from a plurality of instructions in the microprogram controller 10 and the same is supplied to the instruction terminal I of the controller 10 through a register 15.

In the present case, the controller 10 has 16 kinds of instructions.

A selector 16 is supplied with plural pieces of desired one-bit information and one of which is selected according to information read out from the microprogram memory 12. The one-bit information from the selector 16 is supplied to the terminal CC of the microprogram controller 10 as a condition code, which is combined with the instruction bit and serves as information for enabling the next address to be decided on as the previous one advanced by one increment, or the address supplied at the direct input terminal D, or another address altogether.

The microprogram memory 13 provides, for example, information about the address of the destination of a "GO TO statement", the number of times of repetition of a DO loop, or the like, and the same is latched by a register 17a.

The microprogram memory 14 provides information about the microinstructions and the same is supplied to the arithmetic unit of this processor through a register 18.

There is also provided a predetermined code generator 25 for outputting a predetermined code which has been properly established by the designer and the predetermined code from this predetermined code generator 25 is supplied through a register 26 to the arithmetic unit by way of the bus common with the microinstruction from the microprogram memory 14.

The microprogram controller 10 is adapted to enable one of three enable signals, PL, VECT, and MAP, according to the instruction bit. Hence, one of the registers 17a to 17c is enabled according to the instruction bit and the address which has been latched by that register becomes the direct input. The signal PL is enabled by most of the instructions, while the signals VECT and MAP are enabled only be special instructions. And that, in a state of that instruction bit, whether the direct input is chosen or not is dependent on the condition code from the selector 16.

The microprogram controller 10 is so arranged that, when the 4-bit instruction bit from the register 15 is [0000], which represents an instruction [JUMP ZERO], the address zero as the start address is always output from the microprogram controller 10 regardless of the condition code.

The TC 4 includes a RAM 41 in which the programs to be supplied to the microprogram memories 11-14 are stored and an address generator 42 for the same.

There is also provided a mode signal generator 43 for generating 2-bit mode signals MA and MB to effectuate three modes—execution mode, reset (stop) mode, and program exchange mode—, as well as a write signal generator 44 for generating a program write signal for the microprogram memories 11-14 in the program exchange mode.

The mode signal generator 43 is formed, for example, as shown in FIG. 3.

That is, the switches SWA and SWB are switches to be changed by the user, one terminal A being applied with a positive D.C. voltage and the other terminal B being grounded. And, a signal a obtained at the switch SWA is supplied to one input terminal of the OR gate 45. And, a signal b obtained at the switch SWB is, on one hand, led out as the mode signal MB and, on the other hand, supplied to the other input terminal of the OR gate 45. And, the mode signal MB is led out from the OR gate 45.

In this case, the modes are established as shown below from the 2-bit mode signals MA and MB:

TABLE 1

| | |
|---|---|
| MA = 0 MB = 0 | program transfer mode |
| MA = 1 MB = 0 | reset (stop) mode |
| MA = 1 mb = 1 | execution mode |

That is, when the switch SWB is turned to the side of the terminal A, the mode is set to the execution mode regardless of the state of the switch SWA, when the switch SWA is turned to the side of the terminal A and the switch SWB is turned to the side of the terminal B, the mode is set to the reset mode, and when the switch SWB is turned to the side of the terminal B and the switch SWA is also turned to the side of the terminal B, the mode is set to the program exchange mode.

As apparent from the above mentioned Table 1, execution of the program is stopped when the signal MB is turned to "0" and the program becomes executable when the signal is turned to "1", and so the mode signal MB is understood to mean a reset (stop) signal.

When the signal MA is turned to "0", exchange of program becomes possible. Therefore, the mode signal is understood to mean a change signal.

By these two mode signals MA and MB, each of the modes are effected in the following manner.

That is, the selector 20 selects the address for the microprogram memories 11-14 from the address from the microprogram controller 10 and the address from the TC 4. As the select signal therefor, the signal MA is supplied and the address from the microprogram controller 10 is selected when the signal MA is "1", and the address from the TC 4 is selected when the signal MA is "0".

A gate circuit 21 gates a write signal WR according to the signal MA as the gate signal. Namely, the gate is open when the gate signal MA is "0" and the signal WR is supplied to each of the write enable terminals $\overline{WE}$ the microprogram memories 11-14.

The microprogram memories 11-14 are brought to a write enabled state when "0" is supplied to their write enable terminals $\overline{WE}$.

Further, the signal MB is supplied to the reset terminal of the register 15, and when the same is "0", the register 15 is reset.

And, The TC 4 is provided with a clock generator 46 of a fast clock CKF at 7.16 MHz (two times as high as the color subcarrier frequency of NTSC color signal) as well as a clock generator 47 of a slow clock CKS at 2 MHz.

The fast clock CKF used at the time of program execution is supplied to the microprogram controller 10 and the registers 15 and 18, and further to the clock terminals of the registers 17a and 17b.

And, the clock CKF is also supplied to the clock terminal of a register 19 through a buffer 22.

The slow clock CKS used at the time of program transfer is supplied as the clock to a load control unit 48 within the TC 4 as well as to the address generator 42 and others, and the same is also supplied to the clock terminal of the register 19 via a buffer 23.

The mode signal MA is supplied as is to the output enable terminal of the buffer 23 and also supplied through an inverter 24 to the output enable terminal of the buffer 22, whereby, as also discussed later, the output of the buffer 22 is made effective at the time of execution of a program and the fast clock CKF is supplied to the register 19, while the output of the buffer 23 is made effective at the time of transfer of a program and the slow clock CKS is supplied to the register 19.

The load control unit 48 within the TC 4 supervises the states of the mode signals MA and MB and controls the processing in the TC 4 according to each mode.

In the program execution mode, the mode signal MA is "1", and so, the selector 20 provides the addresses changing with the fast clock CKF from the microprogram controller 10 and these addresses are supplied to each of the microprogram memories 11-14 through the register 19 at the timing delayed by one clock. At this time, since the mode signal MA is "1", the buffer 22 is effective and the clock of the register 19 is the fast clock CKF.

And, since the signal MA is "1", the output of the OR gate 21 is kept on at the "1" level and the memories 11-14 do not become write enabled.

Further, since the mode signal MB is "1", the register 15 is not reset, and so, the data read out from the microprogram memory 11 is delayed by one clock of the clock CKF in this register 15 and supplied to the instruction terminal of the microprogram controller 10 whereby the program is executed.

At this time, since the mode signal MA is "1", the register 18 to which the signal MA is supplied through an inverter 27 is rendered output enabled, while the register is disables, and so, the microinstruction read out from the microprogram memory 14 is delayed by one clock of the clock CKF in the register 18 and supplied to the arithmetic unit.

In the present execution mode, while the program is executed with the fast clock CKF, there are provided pipeline registers, namely, the register 19 between the microprogram controller 10 and the microprogram memories 11-14, as well as the registers 15 and 17a and a register (not shown) at the input of the selector 16 between their respective output sides of the microprogram memories 11, 13, and 12 and the microprogram controller 10. And thereby, the clock cycle can be shortened.

That is, the image processing apparatus of the present example, a parallel processing system by the use of multiprocessors is primarily employed, but a pipeline processing system is also employed in some portion as mentioned above to achieve higher speed processing.

In the program transfer mode, the mode signal MB is "0", and so, the register 15 is reset and [0000] is supplied to the instruction terminal of the microprogram controller 10. Hence, the microprogram controller 10 outputs the zero address continuously and is stopped. That is, the program addresses for all the processing systems processors, the PIP 3A and PVP 3B, are "0" and they are in the program stopped state.

Since the mode signal MA is also "0", the selector 20 is brought to the condition to select the address from the address generator 42 of the TC 4. And, since the output of the buffer 22 is made invalid and that of the buffer 23 is made valid, the clock of the register 19 becomes the slow clock CKS.

Namely, in this program transfer mode, all the microprogram memories of all the processors are completely controlled by the TC 4, and hence, the clock becomes the slow clock CKS.

Since the mode signal MA is "0", the register 26 is rendered enabled and the register 18 is rendered disabled, and so, the predetermined code from the predetermined code generator 25 becomes to be supplied to the arithmetic unit.

In the present case, it is also practicable to arrange such that the signal MA is supplied to the output enable terminal OE of the microprogram controller 10 and the output buffer of the microprogram controller 10 is thereby turned off.

In this program transfer mode, addresses are supplied from the address generator 42 to the RAM 41 under instruction from the load control unit 48 in accordance with the program for program transfer of the TC 4, and the program data to be sent to the microprogram memories 11-14 are read out from the RAM 41 at the rate of the clock CKS. At the same time, the write signal WR from the write signal generator 44 becomes "0", and since the mode signal MA is "0", the output of the OR gate 21 also becomes "0", and therefore, the microprogram memories 11-14 are brought to a write enabled state.

Thus, according to the addresses from the address generator 42, the program data from the RAM 41 are sequentially written in the microprogram memories 11-14 and the program transfer is carried out.

In the present example, the program transfer is made to each of the plurality of processors, one at a time.

That is, the TC 4 is provided with a ROM 49 in which a processor select signal is stored. At the time of program transfer, the processor select signal is read out from the ROM 49 under instruction from the load control unit 48. The processor select signal is decoded in a decoder 50, whereby only select signal SEL for the selected processor becomes "0" and others become "1". This select signal is supplied to the OR gate 21, and only the microprogram memories 11-14 of the processor in which the select signal SEL is "0" are rendered write enabled and the program is rewritten therein.

When rewriting in the microprogram memories of one processor is finished, the ROM 49 delivers the processor select signal of the next processor, whereby the select signal SEL to that processors becomes "0" and the program transfer to this processor is carried out in the same way as described above. If the programs of all of the processors have to be exchanged, the above procedure is repeated the same number of times as the number of the processors.

Now, it is possible to arrange such that specific data other than the processor select signals are stored at a specific address in the ROM 49, and in the case where the program is not to be transferred to all of the processors but to be transferred to a few of them, the specific data at the specific address are read out under instruction from the load control unit 48 to be given when the transfer to the few processors have been finished, namely, when the program transfer to the sequentially designated processors covering all of them to which the program had to be transferred has been finished. And, this output from the ROM 49 may be supplied to a detector circuit 52 for detecting the specific data. And thus, it can be arranged such that, when the specific data are read out from the ROM 49, the same is detected by the detector circuit 52, and the detection signal is supplied to the load control unit 48 to stop the program load.

As the specific data, such data of the processor select signal of which all bits are "1" may be used, in which case, the specific detector circuit 52 may be formed of an AND gate.

It may also be practicable to put signals other than those to be essentially sent to each of the processors, such as program contents, address thereof, and different parameters for each of the processors, in the specific data and make use of such specific data.

Then, if the programs to be sent to each of the processors are more than one, or the programs to be sent to each of the processors are more than one and different from each other, these programs together may be considered to be one program and written in each processor. And, designation of the program to be executed in the next place by each processor may be given by providing each processor with the relevant execution start address.

The execution start addresses are supplied from the RAM 51 to the register 17c of each processor. And, as the latch signal for this register 17c, the above mentioned select signal SEL is supplied thereto, and at the timing the select signal SEL is turned from "0" to "1", the then appearing execution start address is latched.

The register 17c is enabled by an enable signal MAP from the microprogram controller 10, and thereby, the latched data are supplied to the direct input terminal D. When the program is started in the previously discussed execution mode, it is adapted such that the address from the register 17c is taken in by the microprogram controller 10, and therefrom, the address from the microprogram controller 10 is generated.

In the described manner, the program and the execution start addresses thereof are sent to each processor in sequence.

Incidentally, the execution start addresses for each processor in the RAM 51 are previously supplied thereto from the host computer 5.

In this program transfer mode, as also described before, the microprogram controller 10 keeps on outputting the zero address and is in a stopped state.

Now, it is not known what microinstruction is stored in the register 18. However, since the register 18 is disabled as described before, the microinstruction is not supplied to the arithmetic unit but a predetermined code from the predetermined code generator 25 is supplied through the register 26 to the arithmetic unit as a microinstruction.

In the present case, the predetermined code is what is freely decided by the hardware designer in advance. If it is made to be an opportune code at the time of the program transfer such as, for example, to forbid writing in the RAM in the processing arithmetic unit, the contents in the RAM will never be destructed during the program transfer.

If, as the predetermined code, such an instruction is prepared as to allow the initial value of the sum-of-products calculating circuit or accumulating circuit to become "0", then it will become possible, when the program transfer is finished and the next program is to be executed, to immediately start the execution without taking the step of initializing the sum-of-products or accumulating calculation.

In the reset (stop) mode, the mode signals MA=1 and MB=0, and so, the address from the microprogram controller 10 is selected by the selector 20 of each processor, and the clock CKF is selected as the clock of the register 19. But, since the register 15 is put in the reset state by the signal MB, the zero address is continuously output from microprogram controller 10 and all the processors are brought into a program execution stopped state.

Since the signal MA is "1", any write signal becoming "0" is not given to the microprogram memories 11–14.

And, in this reset mode, the start address of the specific program desired to be executed in the next place out of the plurality of programs which are previously written in the microprogram memory of each of the processors is respecified.

That is, in the same way as in the program transfer mode, while the processor select signals are output in sequence from the ROM 49, the execution start addresses are sequentially output from the RAM 50 for each of the processors, and the execution start addresses are latched in sequence by the signal SEL in the register 17c of each processor.

Therefore, when entering the execution mode in the next place, execution in each processor will be started with the program for which the execution start address has ben respecified. Thus, different programs can be executed by each of the processors without new programs transferred thereto.

The above described three modes are controlled by the program of the processor in the TC 4.

Figure 4:
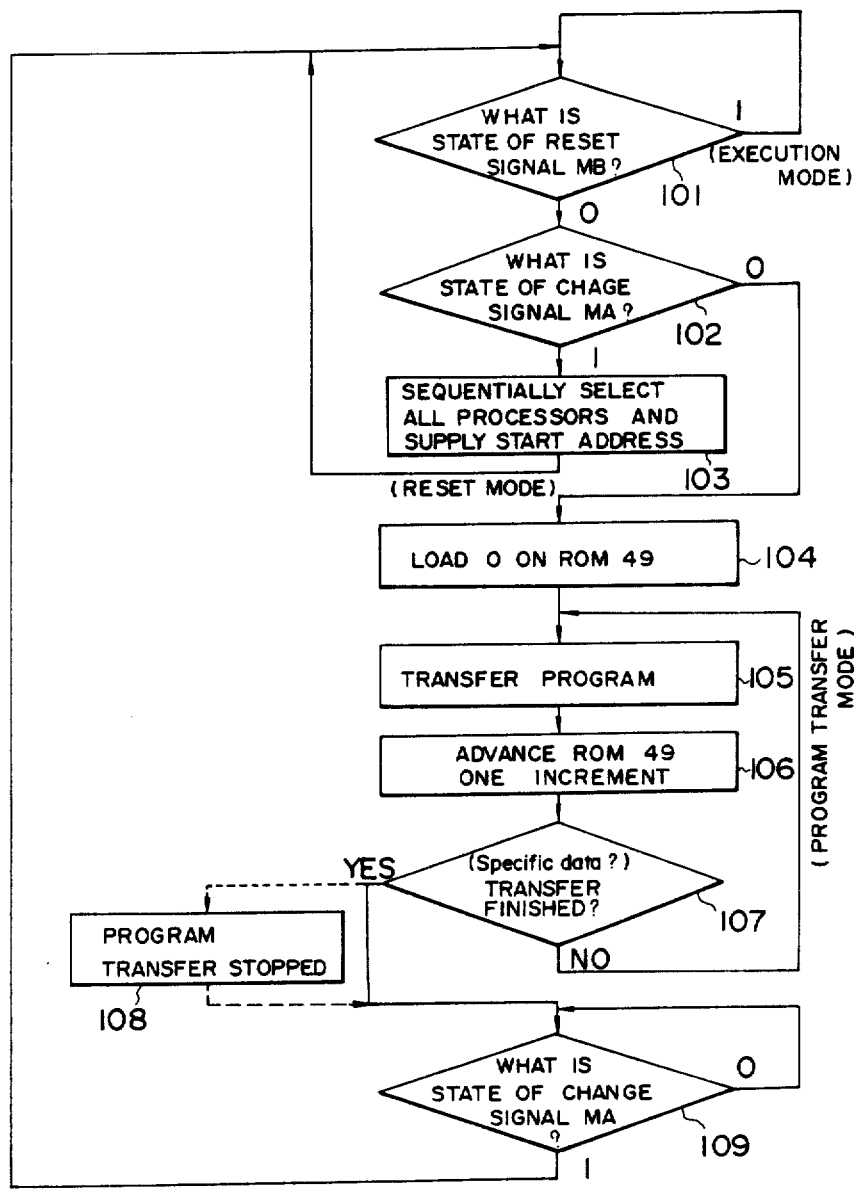
FIG. 4 is a flow chart of mode control.

FIG. 4 is a flow chart showing the relative procedure in the TC 4.

That is, at first, the state of the reset signal MB is detected in the step (101). If the signal MB=1, when the signal MA=1 as apparent from FIG. 3, the mode is judged to be the program execution mode and the TC 4 continues to take the step (101).

If the signal MB becomes MB=0, the program proceeds from the step (101) to the step (102), wherein state of the signal MA is detected.

If the signal MA=1, the mode is the reset mode, and, as described previously, the microprogram controllers 10 of all of the processors continuously output the zero address and the program execution is stopped. The program then proceeds to the step (103), wherein the start address is given to each of the processors in sequence, and returns to the step (101).

In the step (102), if the signal MA=0, since the signal MB=0, the mode becomes the program exchange mode. The program proceeds to the step (104), wherein 0 is loaded in the ROM 49 of the TC 4 whereby the first processor is specified, and in the step (105), the program is transferred to that processor. In the next step (106), the address in the ROM 49 is advance by one increment. In the next step (107), it is judged whether the program has been transferred to all the processors, or to all of the processors to which the program had to be transferred, and if it has not been finished, the program returns to the step (105) and the program is transferred to the next processor in the step (106).

The steps (105) to (107) are repeated the same number of times as the total number of the relative processors.

If it is judged that the transfer of the program has been finished in the step (107), the program proceeds to the step (109), wherein the state of the signal MA is detected. If the signal MA=0, this step (109) is repeatedly taken and the program exchange mode is held on. If the signal MA is turned to MA=1, then the program is released from the program exchange mode and returns to the step (101).

In the case where the program transfer is to be decided to have been finished by detection of some specific data, the address in the ROM 49 is, although advanced by one increment in an ordinary case, changed to the address at which the specific data are written in the step (106), and the same is read out.

In the next step (107), judgement whether or not the read output from the ROM 49 is the specific data is made in the specific data detector circuit 52.

If the read output from the ROM 49 is the specific data, program transfer stopping is effected by the load control unit 48 in the step (108).

If the read output from the ROM 49 is not the specific data, the program returns to the step (105) and the program transfer is made for the next processor.

When the program transfer is stopped in the step (108), the state of the signal MA is detected in the next step (109).

Although the above description has been made taking a multiprocessor system as an example, it is a matter of course that the present invention is also applicable to mode controlling of one processor.

In the case of the above example, a plurality of processors constituting a parallel processing apparatus are adapted to be totally controlled in three modes by the TC 4, and so, each of the processors can be controlled without having conflicts with each other. That is, if a plurality of processors are controlled individually, some may execute a program, some may exchange a program, and some may be reset, and thus, there is possibility of erroneous execution to be made. According to the above described example, such a fault can be prevented.

In the case of the present example, it is possible to shift from the program exchange mode or the execution mode to the reset mode instantly by adoption of the switches SWB and SWA. Therefore, in the middle of program execution or in the stage where program exchange has not been finished for all the processors, the mode can be changed to the reset mode as required.

According to the present invention, process execution—stopping and program transfer can be clearly and consistently controlled by virtue of the total controlling of the data processors in the three modes.

According to the present invention, the program execution and transfer can be performed effectively without reducing the execution speed or without increasing the hardware by virtue of the proper use of different clocks according to whether the mode is the program transfer mode or the program execution mode.

According to the present invention, at the time of program transfer, supply of any instruction from the microprogram memory to the arithmetic unit is forbidden, and instead, a predetermined code most opportune at the time of program transfer is supplied to the arithmetic unit as an instruction. And therefore, such insecurity that it is not known what instruction is now supplied to the arithmetic unit can be removed, and, for example, the contents of the memory in the arithmetic unit can be protected.

According to the present invention, since it is arranged therein such that, when a signal to be sent to a processor to which a program is to be transferred becomes a specific one, it is detected and the program transfer is thereby stopped, the program transfer can be easily finished at any time point. Thus, the total loading time for the program transfer can be reduced.

Figure 5:
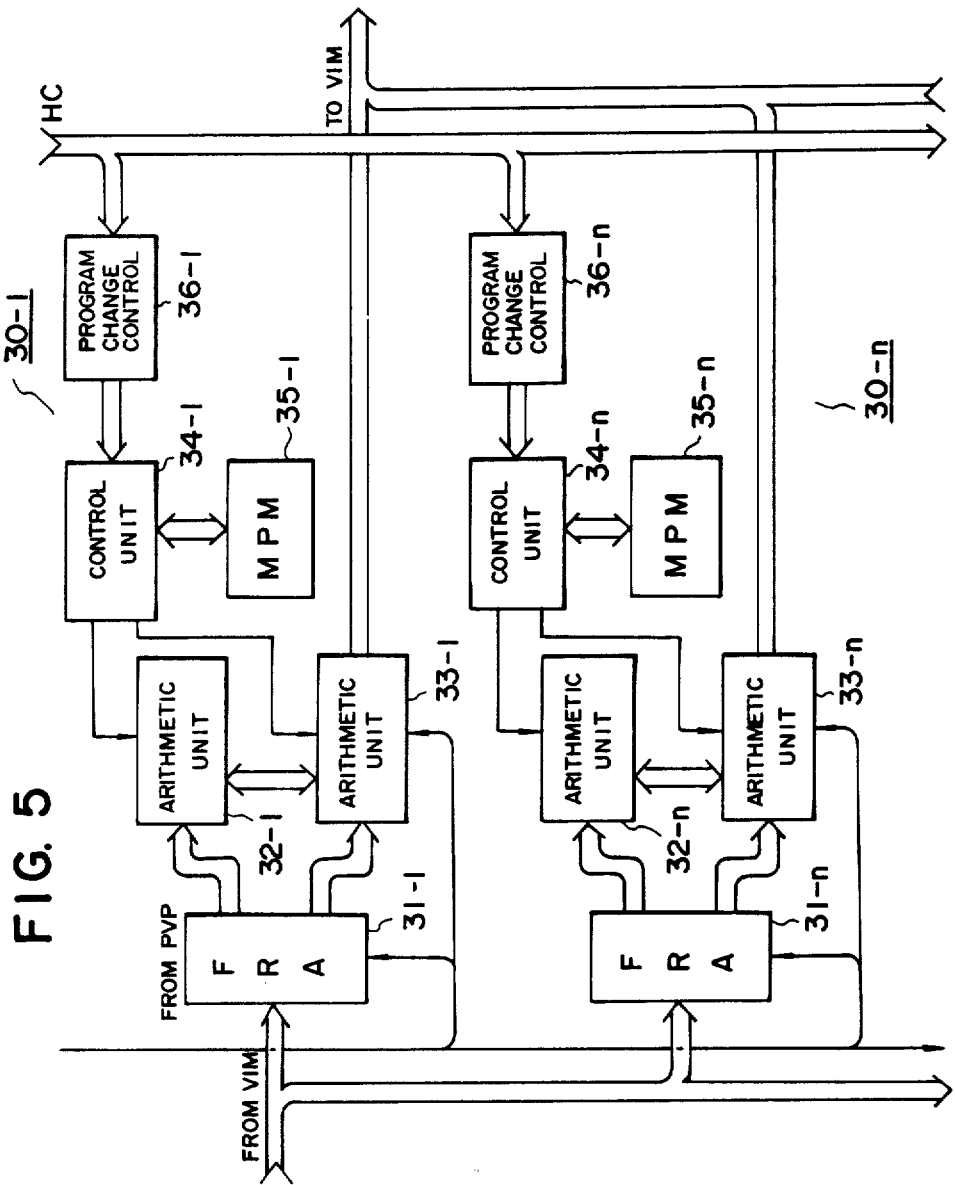
FIGS. 5 and 6 are block diagrams showing examples of the main portion of the image processing apparatus of FIG. 1.

FIG. 5 shows a concrete structure of the PIP system 3A. Although the PIP system 3A has, in reality, a large number (60 sets, for example) of processors arranged in parallel, only two sets of them are shown in the drawing. In this drawing, digital data from the VIM system 2 are supplied to input registers 31-1 to 31-n (hereinafter to be called the FRA) provided for each of the processors 3-1 to 3-n, and these registers are controlled by the PVP system 3B in accordance with the address read out of the VIM system 2 and stored with a predetermined amount of data necessary for each processor.

The data written in these registers 31-1 to 31-n are supplied to arithmetic units 32-1, 33-1 to 32-n, 33-n, respectively. Each of the arithmetic units is provided with an adder/substractor, multiplier, coefficient memory, data memory, etc. and makes linear and non-linear data conversion calculations according to control signal from the control units 34-1 to 34-n. Results of the calculations are obtained at the arithmetic units 33-1 to 33-n, and further, the arithmetic units 33-1 to 33-n are controlled by the PVP system 3B according to write addresses of the VIM system 2, whereby the results of the calculations are written in necessary portions in the VIM system 2.

In the present case, the control signals from the control units 34-1 to 34-n are formed according to the microprogram written in the microprogram memories (MPM) denoted by 11-14 in FIG. 2 (denoted representatively by 35-1 to 35-n in FIG. 5). The microprogram is written from outside through program change controls 36-1 to 36-n.

However, in the above case, if the above mentioned microprogram is formed by the existing host computer (HC) 5 etc., the transfer rate from the HC 5 to each MPM 35-1 to 35-n is limited by the capacity of the line, and therefore, it is only possible to transfer the program at the rate, for example, of 500 Kbytes/sec or so, and therefore, it takes much time for the rewriting in all of the MPMs 35-1 to 35-n. Due to the fact that processing in the PIP system 3A etc. becomes impossible during that time, many inconveniences have been experienced. And, since the transfer cannot be performed until the processing in the PIP system 3A etc. has been finished, the HC side has had to wait until it is finished, and therefore, there has been such a difficulty that the efficiency or usage of the HC is considerably lowered.

Figure 6:
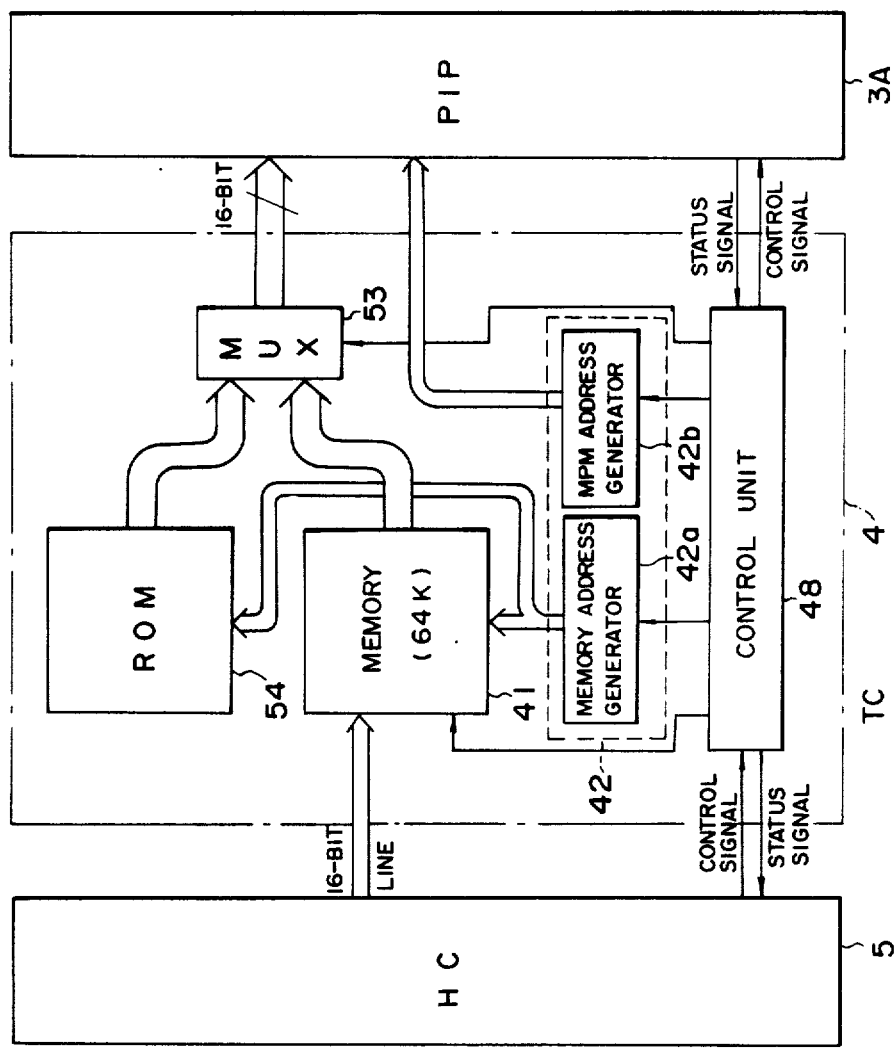

In FIG. 6, the microprogram transferred in 16-bit structure from the host computer (HC) 5 is supplied to the previously described 64 Kbytes memory 41 in the TC 4. Further, a write control signal from the HC 5 is supplied to the control unit 48, the signal from the control unit 48 is supplied to the memory 41 and the memory address generator circuit 42a in the address generator circuit 42, and the generated address is supplied to the memory 41, whereby the microprogram is written in the memory 41 at an arbitrary address. At this time, a status signal showing that the memory 41 is write enabled is supplied from the control unit 48 to the HC 5.

Further, a status signal showing that the microprogram memories are rewrite enabled is supplied from the PIP system 3A to the control unit 48. And thereby, the signal from the control unit 48 is supplied to the memory address generator circuit 42a and the MPM address generator circuit 42b. And, while the addresses to sequentially read the memory 41 are generated by the circuit 42a, a chip select signal for writing the read microprogram in the specified MPM and addresses for writing the program in sequence in the MPM are generated by the circuit 42b.

Thus, while the microprogram read out from the memory 41 in, for example, 16-bit structure is supplied to the PIP system 3A through a multiplexer (MUX) 53, the addresses etc. from the circuit 42b are supplied to the PIP system 3A. Further, the write control signal from the control unit 48 is supplied to the PIP system 3A.

According to the above described arrangement, the memory 41 and the PIP system 3A can be connected through a dedicated line and, further, transfer in multi-bit structure, such as 16-bit structure, can be practiced. Therefore, assuming that the transfer rate is 8 Mbytes/sec, for example, the transfer can be made at the rate 16 times as high as that in the case of the conventional direct transfer from the HC, 500 Kbytes/sec, for example.

Further, in the case where the same microprogram is to be transferred to the plurality of processors in the PIP system 3A, the program can be sent to them simultaneously by arranging a plurality of chip select signals to be generated by the MPM address generator circuit 42b. And thereby, the program can be transferred, for example, within the vertical blanking period of the video signal, and thus, real-time signal processing can be performed without producing any disturbance in the image.

The described transfer process has been made possible by structuring the control unit 48 etc. with a so-called microprocessor.

Incidentally, the above described program transfer can be applied not only to the PIP system 3A as described above but also to the IOC system 1, PVP system 3B, etc.

Even in such cases, however, the transferring time between the HC 5 and the memory is the same as before and the HC 5 and the line are occupied during the transferring time, and so, there is the possibility of a lowering of efficiency in the usage of the HC 5 and the line.

In the above described example, when the program is to be transferred to inside the TC 4, it has been arranged such that the program only is sent thereto and the address in the RAM 41 is produced inside the TC 4. In the next example, the address in the RAM 41 is also transferred from the HC 5 together with the program.

Figure 7:
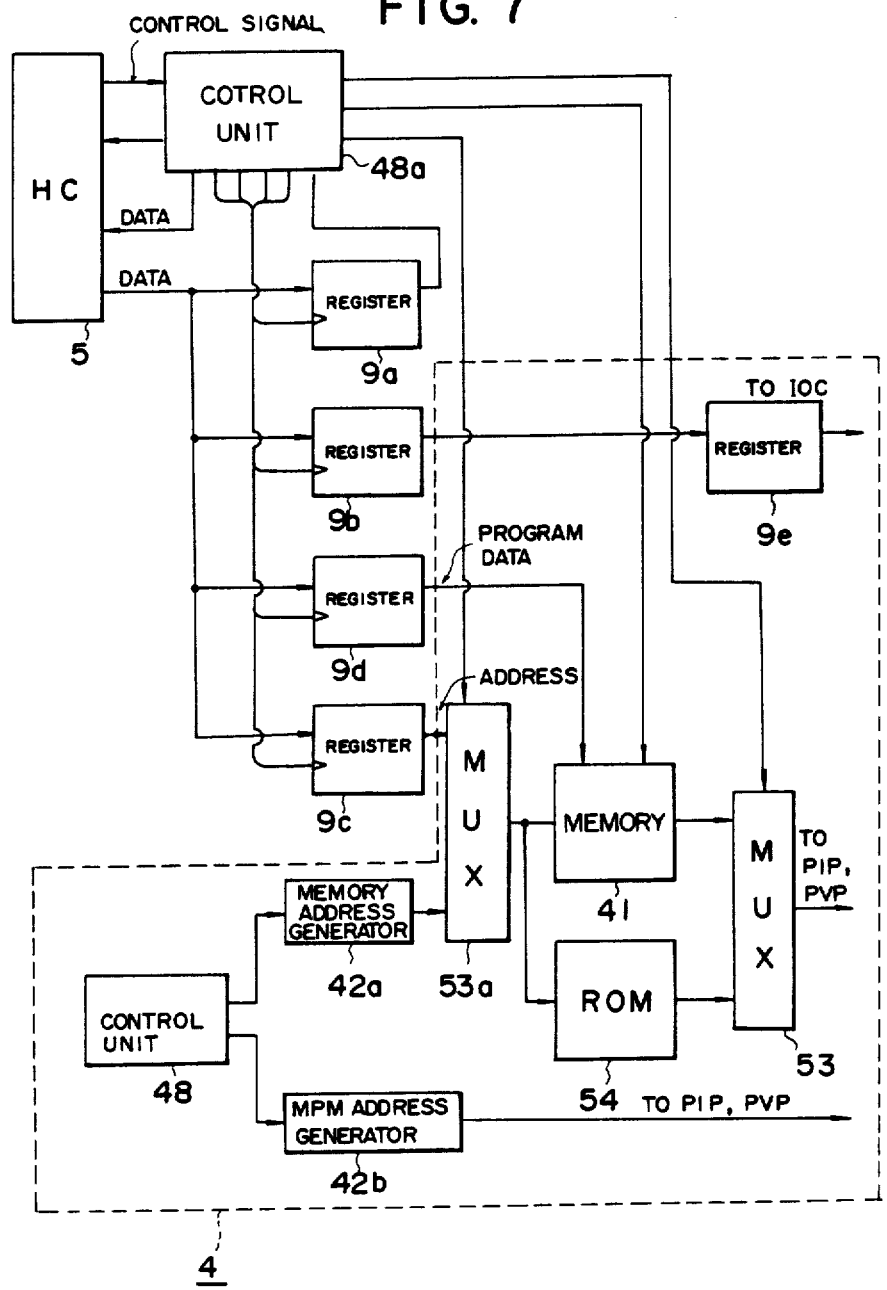
FIG. 7 is a block diagram showing another example of the main portion of the image processing apparatus of FIG. 1.

That is, in FIG. 7, the data transferred, for example, in 16-bit structure from the host computer (HC) 5 are supplied to registers 9a, 9b, 9c, and 9d, each being of 16-bit structure. And, a control signal from the HC 5 is supplied to the control unit 48a and the produced write signal is supplied to the registers 9a–9d.

Figure 8A:
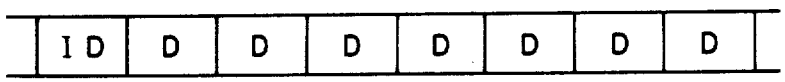
FIG. 8, comprised of FIGS. 8A–8G, is a timing chart showing operations of the arrangement of FIG. 7.
Figure 8B:
Figure 8C:

Here, as the data from the HC 5, as shown in FIG. 8A, for example, data identification information (ID) is transferred at the timing in synchronism with the control signal (the start signal: FIG. 8B) indicating the start of the transfer from the HC 5, and thereafter, data (D) are transferred at intervals of a predetermined clock (FIG. 8C). Then, the above identification information (ID) from the control unit 48a is written in the register 9a by means, for example, of the write signal output to the register 9a at the timing of the above mentioned start signal, and this information is detected in the control unit 48a. Then, the data D are written in sequence in the register 9b by means of the write signal output to the register 9b at the timing of the clock. The data (D) are supplied through a register 9e to the IOC system 2, etc. In the data (D), there are provided, for example, the kind of processing system (NTSC, RGB, etc.) and information for mode setting (real time, waiting for processing to be finished, still picture, etc.).

Figure 8D:
Figure 8E:
Figure 8F:
Figure 8G:

When the above mentioned microprogram is to be rewritten, information (L) showing the length of the program to be transferred following the identification information (ID) is transferred from the HC 5, in succession to the identification information (ID) as shown in FIG. 8(D). Thereafter, later discussed addresses (A) of the memory 41 and data forming the program (PD) are transferred alternately. Meanwhile, from the control unit 48a, as shown in FIG. 8E, a write signal is again output to the register 9a at the timing of the next clock to that for the start signal—in response thereto the identification information (ID) indicating the program has been written in the register 9a—, and thereby, the information (L) about the length is written in the register 9a. Then, as shown in FIGS. 8F and 8G, write signals are alternately output to the registers 9c and 9d every other clock, whereby the address A is written in the register 9c and the program data PD is written in the register 9d, separately.

The address A from the register 9c is supplied through a multiplexer (MUX) 53a to the memory 41 and the program data (PD) from the register 9d are written at that address. Meanwhile, a write control signal is supplied from the control unit 48 to the memory 41. And, the writing is made to the extent specified by the length information (L).

When the writing is finished, the MUX 53a is switched by a signal from the control unit 48a. And, a signal from a second control unit 48 is supplied to the memory address generator circuit 42a and MPM address generator circuit 42b. While addresses to read in sequence the memory 41 are output from the circuit 42a, chip select signals for writing the read microprograms in a specific MPM and addresses for sequentially writing the same in the MPM are output from the circuit 42b.

Thus, the microprograms read from the memory 41 are supplied through the multiplexer (MUX) 53 to the PIP system 3A, PVP system 3B, etc. and the addresses etc. from the circuit 42b are supplied to the PIP system 3A and others.

In the above described apparatus, since it is adapted such that the program data (PD) and the address data (A) are separated and writing in the memory 41 is made according to these addresses, it is made possible to change a portion of the program while keeping all the rest of the program as it is. That is, in a filtering process, a new filtering can be performed with the program for arithmetic processing not changed but only the coefficient data therein changed. In such a case, with the above described apparatus, first, the entire arithmetic program is transferred, and then, according to the need, only the coefficient data are exchanged, and thereby, various processes can be performed.

With the above described apparatus, it takes twice as long a time as in the conventional care for transferring the first program, but the data for changing the coefficient data etc. in the filtering process only accounts for 1% or less of the entire data. Therefore, supposing five exchanges are made, if the entire portion is expressed by 1, the time taken by the present apparatus becomes $$1 \times 2 + 0.01 \times 2 \times 5 = 2.1,$$

which is less than half that in the conventional case, i.e., $$1 \times 5 = 5.0.$$

Further, with the above described apparatus, it becomes unnecessary to provide a circuit for generating the write address within the apparatus.

According to the present invention, since addresses are attached to the data forming the microprogram transferred from the host computer and the writing is made according to these addresses, it is possible to rewrite any portion of the program once written in the memory by specifying the address for that portion. Thus, in such a case to rewrite a portion of a long program, it is required to transfer only that portion, and therefore, it has become possible to finish the rewriting in a very short time.

It sometimes occurs that the result of the processing performed according to a transferred microprogram is found to be incorrect. Various causes are considered for occurrence of such an incorrect result, such as malfunction of the processor etc. within the processing apparatus, failure in the line between the HC and the processing apparatus, and other. And, there have been such problems that the cause is difficult to determine.

Therefore, such a practice has been taken up so far as to inspect the processors with a probe one by one, after having each of the processors provided with a testing terminal, or to inspect the line with the operation of the HC halted. However, in the case of the apparatus including a large number of processors as described above, it has taken much time and labor for checking those processors one by one. And, since the line has been inspected first for the reason that such a failure in general is attributable to the line, the HC has had to be frequently halted and it has been a problem that the efficiency of the usage of the HC is thereby lowered.

Therefore, the TC 4 is provided, as shown in FIG. 6, having a ROM 54 with a program for diagnosis written therein. In the program for the diagnostic purpose, such a system is adopted that arithmetic operations are made with all the functions of the processor employed therein and the results are compared with previously calculated right answers. Further, by properly arranging a program, it is enabled to detect, from each register incorporated in the processor, whether the processor is in good order or not.

While the address from the memory address generator circuit 42a is supplied to the ROM 54 and the program from the ROM 43 is supplied to the MUX 53, a control signal from the control unit 48 is supplied to the MUX 53, and thereby, the program from the RAM 41 is supplied to the PIP system 3A. Further, the addresses etc. from the circuit 42b are supplied to the PIP system 3A. And, the write control signal from the control unit 48 is supplied to the PIP system 3A.

Therefore, in the above described arrangement, by supplying a command signal from outside to the control unit 48 when incorrectness or such a thing is found in the result of the processing, the program written in the ROM 54 is supplied to the PIP system 3A and the processors etc. of the PIP system 3A are diagnosed. If there is found nothing wrong in the result of the diagnosis, it is understood that no processor is out of order and the line between the HC and the apparatus is then inspected, but if something is found to be wrong in the result of the diagnosis, the processor is subjected to closer examination.

Figure 9:
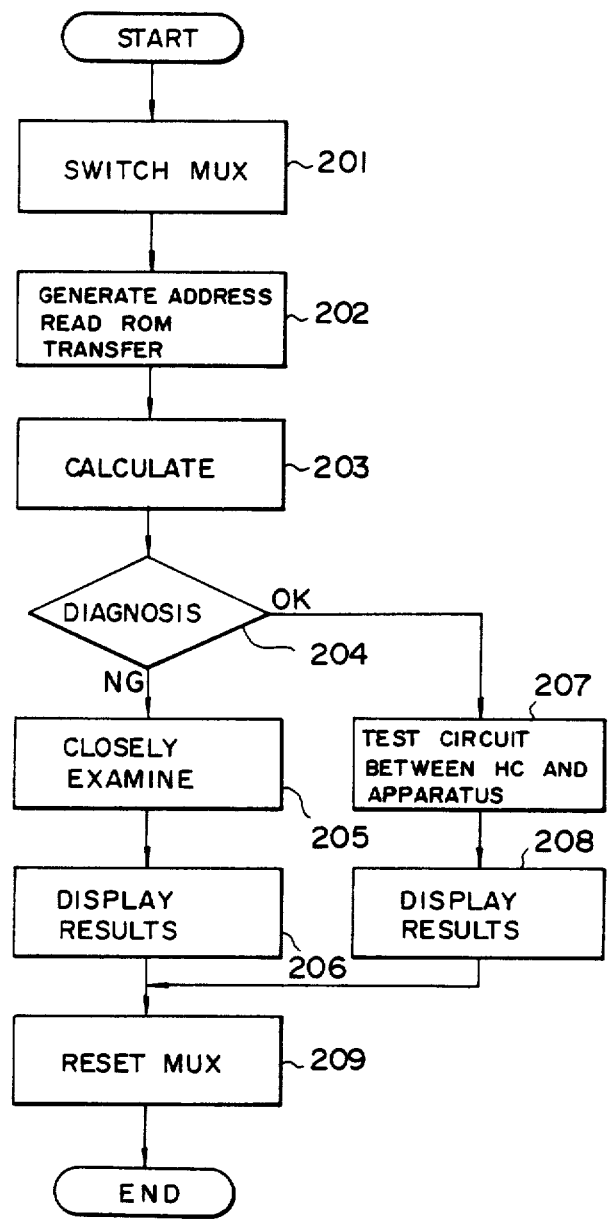
FIG. 9 is a flow chart showing a diagnosis circuit as indicated in FIG. 6.

Shown in FIG. 9 is a flow chart for the diagnosis, wherein, first, in the step (201), the MUX 53 is switched to the side of the ROM 54. In the next step (202), the address generator circuits 42a and 42b are driven and the ROM 54 is read, whereby the program for diagnosis is transferred to the PIP system 3A. Further, in the step (203), arithmetic operations are made by the processor according to the program for diagnosis.

In the step (204), decision (diagnosis) by the result of the operations is made, and if it is found to be incorrect (NG), a closer examination is made in the step (205) and the result thereof is displayed in the step (206). When the operation result is correct (OK) in the step (204), the line between the HC and the apparatus is inspected in the step (207) and the result thereof is displayed in the step (208).

When the display is made in the steps (206) or (208), the MUX 53 is reset to the side of the memory 41 and the diagnostic operation is ended.

According to the above described arrangement, in which the diagnostic operation is performed in the described manner, the ROM 54 with the program for diagnosis written therein is incorporated in the transferring arrangement, and so, the transfer of the program is not affected by the line whether it is good or not and correct diagnosis is ensured, and that, by the result of the diagnosis, it can be decided whether the line is good or not.

Further, since the program for diagnosis can be transferred in a shorter time than in the case where the program is transferred from the HC, the diagnosis can be finished quickly and, further, without disturbing the operation of the HC, whereby the reliability on the overall apparatus can be improved.

The processing to diagnose the processor with a built-in ROM has been made possible by forming the control unit 48 etc. of so-called microprocessors.

The diagnosis of the processor is applicable not only to the PIP system 3A as described above but also to the IOC system 1, PVP system 3B, etc.

And, the above described ROM 54 can be loaded with programs etc. which are repeatedly used for ordinary processing in addition to the program for diagnosis.

According to the present invention, since the ROM with the program for diagnosis written therein is provided in the apparatus and it is adapted such that this program is transferred, in the event of need, to each microprogram memory so that the processor may be diagnosed, it is enabled to easily diagnose the processor being out of order, while keeping the operation of the host computer unaffected during the diagnosis.

In the TC 4 of the embodiment in FIG. 2, it is required to provide many memory units and peripheral circuits such as the RAM 41 for storing the program, the address generator circuit 42 for generating the addresses therein, the ROM 49 for storing the select signal of each of the processors, and the RAM 51 for storing the execution start addresses for each processor, but is possible to embody these in a large scale memory.

Figures 10, 11:
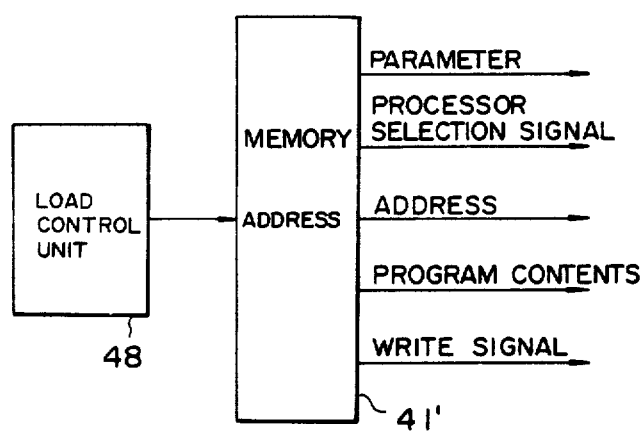
FIG. 10 is a circuit diagram showing another example of the main portion of the image processing apparatus of FIG. 1.
FIG. 11 is a drawing indicating contents of a memory shown in FIG. 10.

That is, the load control unit 48 and a memory 41' can be arranged as shown in FIG. 10, and the memory 41' is stored at its sequential addresses with the execution start addresses and such parameters, processor select signals, addresses, program contents, and write signals.

These signals to be supplied to the processors are sequentially read out from the memory 41' according to the addresses from the load control unit 48, whereby the processors selected by the processor select signals are supplied with the parameters and the microprogram memories thereof are written in with the program contents.

With FIG. 11 taken as an example, when the addresses 0 to 7 of the memory 41' are read out, the program contents are written in the microprogram memory of the processor No. 10 at its addresses 0 to 7, and when, in succession thereto, the addresses 8 to 23 of the memory 41' are read out, the program contents are written in the microprogram memory of the processor No. 25 at its addresses 0 to 15.

Now, out of the signals to be sent to the processors shown in FIG. 11, only one kind of the processor select signal and the parameter are given to one processor, i.e., the same signal are repeatedly output for each of the addresses from the memory 41' to one processor.

On the other hand, the program contents and their memory addresses as well as the write signals must be output differently for each address, not for each processor.

In the case where these data are read out from one memory 41' and transferred to each of the processors as shown in FIG. 10, it is required as indicated in FIG. 11 that not only the data necessary for each address of the memory 41' but also the data unchanged for each processor must be stored at the addresses in sequence, and therefore, the efficiency of usage of the memory is lowered very much.

Figure 12:
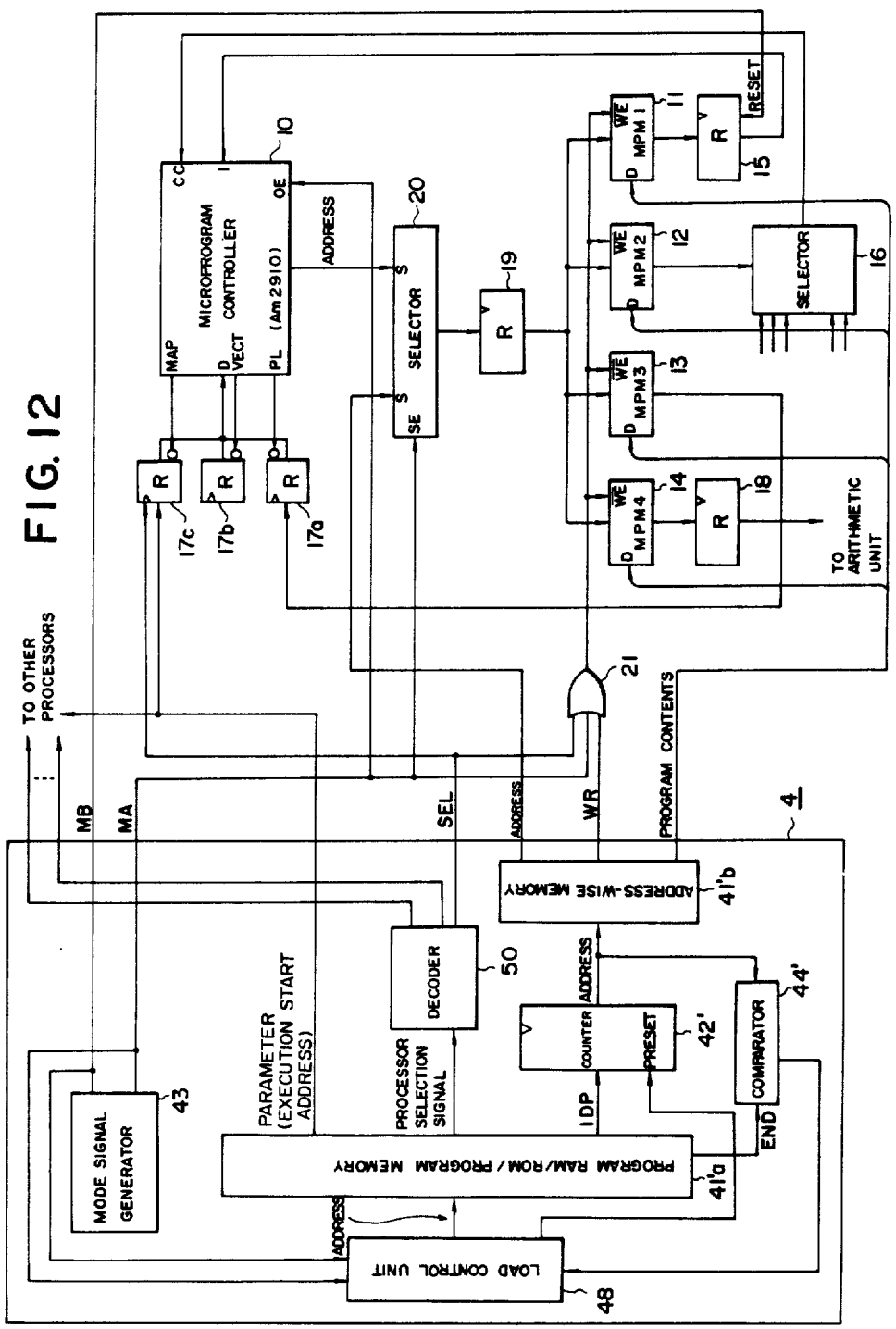
FIGS. 12 and 13 are block diagrams showing other examples of the main potion of the image processing apparatus of FIG. 1.

Then, in another embodiment of the present invention as shown in FIG. 12, the TC 4 is provided with the load control unit 48 and a memory for storing the signals to be supplied to the microprogram memories 11-14. As the memory, in the present case, a processor-wise memory 41'a and an address-wise memory 41'b are provided.

In the processor-wise memory 41'a are stored one kind of data for each of the processors, i.e., the parameter and processor select signal as well as a program identification signal IDP.

In the address-wise memory 41'b are stored the program contents and address data thereof as well as the write signals WR written for each of the addresses.

As the program identification signal IDP in the present example, the address in the front of the address-wise memory 41' for the program to be sent to each of the processors is used. For example, according to the example of FIG. 11, when the processor 10 is selected, the address in the front, "0", for its program, and when the processor No. 25 is selected, the address in the front, "8", for its program are used as the program identification signals IDP, respectively.

Reference numeral 42' denotes a counter for generating the address for the address-wise memory 41'b. The program identification signal IDP from the memory 41'a is preset by a preset signal in synchronism with selection of each processor from the load control unit 48, and its value is sequentially counted up from the preset value.

Reference numeral 44' is a comparator circuit for detecting an end of the program transfer to one processor through comparison of a processor-wise program end address END output from the processor-wise memory 41'a and the address for the memory 41'b from the counter 42'. The comparison output is supplied to the load control unit 48.

In the present program transfer mode, the program transfer to each processor is carried out according to the program transfer program from the TC 4 and under instruction from the load control unit 48 in the following way.

That is, in the first place, the first address is supplied from the load control unit 48 to the processor-wise memory 41'a. Then, the select signal for selecting the processor to which the transfer is to be made at first, the parameter for the processor, the front address as the identification signal IDP of the program for the processor, and the end address END for the program are read out from the memory 41'a.

The processor select signal read out from the memory 41'a is decoded by the decoder 50, whereby only the select signal SEL for the processor to be selected becomes "0" and others become "1". The select signal SEL is supplied to the OR gate 21. Since the mode signal MA is "0" at this time, this OR gate functions so that the microprogram memories 11-14 of the processor for which the select signal SEL is "0" is rendered write enabled when the write signal WR becomes "0", and then, the program becomes rewritable.

On the other hand, the front address as the identification signal IDP is preset in the counter 42' by the preset signal from the load control unit 48, and the counter 42' is allowed to count up from the preset front address value.

As previously described, when the selected processor is the processor NO. 10 as shown in FIG. 11, the same is allowed to count up from the address 0. And, according to the address from the counter 42', the program contents, the address therefor, and the write signal WR becoming "0" are sequentially read out from the address-wise memory 41'b.

Therefore, the microprogram memories 11-14 of the selected processor is written in with the program contents in sequence at the addresses sent from the address-wise memory 41'b.

And, when there appears the end address END (for example, the address No. 7 for the processor No. 10) of the program being transferred to the same processor, agreement between the output address value from the counter 42' and the end value END is detected in the comparator circuit 44', and responding to the detection signal, the load control unit 48 supplies next address which has been advanced by one increment to the processor-wise memory 41'a.

Then, the processor select signal for selecting the next processor is generated by the processor-wise memory 41'a, the select signal SEL selecting the processor becomes "0", and thus, in like manner, the program exchange is carried out for this processor. If the programs of all of the processors are to be exchanged, like operations are repeated the same number of times as that of the processors.

And, in the present example, if a plurality of programs are to be sent to each of the processors or a plurality of programs which are different from each other are to be sent thereto, these plurality of programs are considered to be one program and this program is arranged to be written in each processor. And, it is further arranged such that the programs required by each processor can be specified by providing each processor with an execution start address as the parameter.

The execution start addresses are obtained from the memory 41'a as described above and supplied to the register 17c of each processor. And, the signal SEL is supplied to the register 17c as the latch signal therefor, and at the timing this select signal SEL turns from "0" to "1", the then appearing execution address is latched.

Incidentally, the contents of the memories 41'a and 41'b have been given from the host computer 5 in advance.

In the reset mode, the start address of the program desired to be executed in the next place out of the plurality of programs previously written in the microprogram memory of each processor are respecified. That is, the same as in the case of the program transfer, the processor select signals and the execution start addresses are sequentially output from the memory 41'a for each of the processors, whereby the execution start addresses are sequentially latched in the registers 17c of each of the processors by the signal SEL.

Since the mode signal MA = 1 at this time, the output of the OR gate 21 does not become "0", and therefore the program is not rewritten.

The flow chart of the processing in the TC 4 is similar to that of FIG. 4, but in the step (104), the address 0 is output from the load control unit 48 of the TC 4 thereby to specify the first processor, and in the step (105), the program is transferred to the processor. In the next step (106), the address for the memory 41'a is advanced by one increment. In the next step (107), it is judged whether the programs have been transferred to all of the processors, or have been transferred to the processors to which the programs had to be transferred, and if it is judged not to have been finished, the process flow returns to the step (105) and the program transfer to the next processor is performed in the step (106).

According to the present invention, the apparatus is provided with two memories, i.e., the memory storing processor-wise information and the memory storing address-wise information of the program to be transferred, and thereby, the program supplying portion has been arranged in a hierarchical structure. Therefore, as compared with the case where information for each processor is stored at each of the addresses for the transferred program, the memory area can be saved and effective usage of the memory can be achieved.

Figure 13:
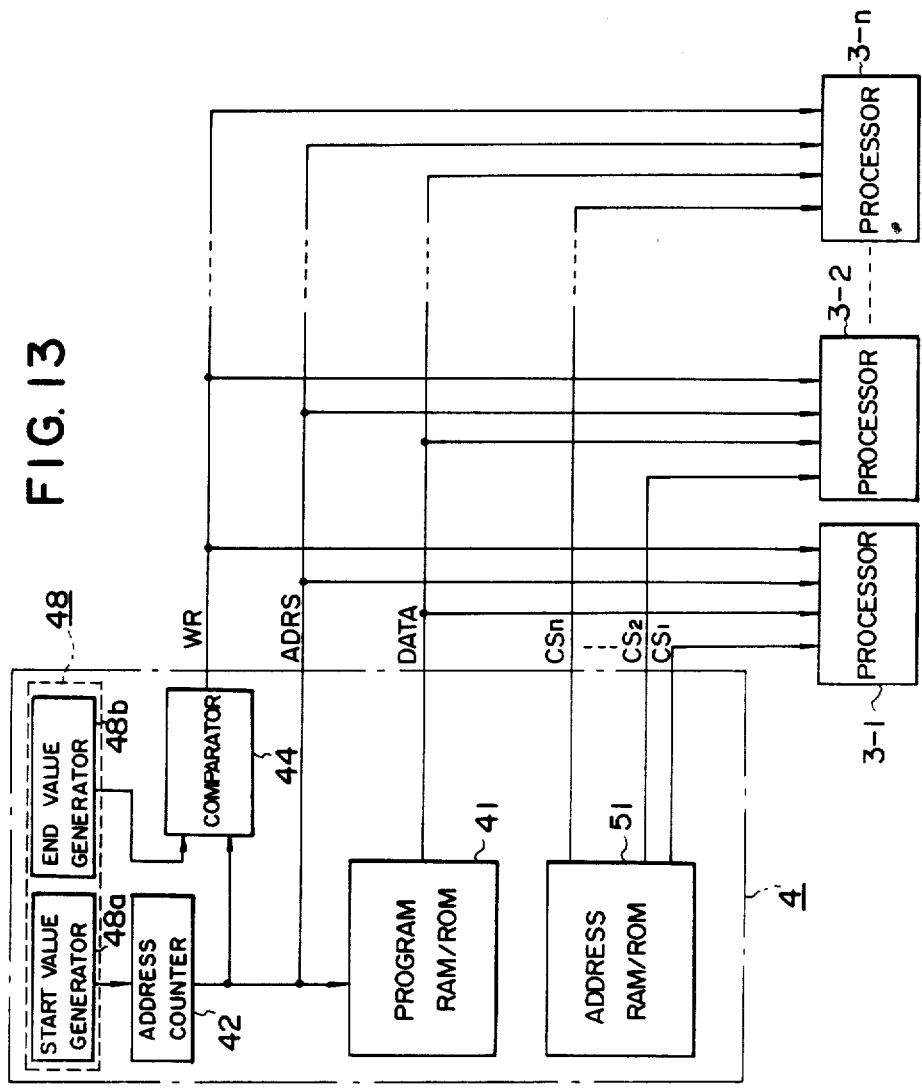

FIG. 13 is for illustrating an embodied circuit of the program transfer system according to the present invention, wherein the case where a plurality of programs are transferred to a plurality of processors is indicated.

The present program supplying portion formed of the TC 4 includes a program RAM or ROM 41 storing the plurality of programs to be transferred, an address RAM or ROM 51 storing the execution start addresses for each of the processors, an address counter 42 for the program RAM 41, and a write signal generator 44 formed of a comparator, and supplies the programs to n sets of processors 3-1, 3-2, ... ,3-n.

In the present case, it is adapted such that only a plurality of programs which have to be sent can be sent out of the plurality of programs stored in the program RAM 41.

That is, the load control unit 48 is provided with a start value generator 48a for generating the start address of the program with lower-numbered addresses of the plurality of programs to be sent out of the plurality of the programs stored in the program RAM 41 and an end value generator 48b for generating the end address of the program with higher-numbered addresses of the plurality of programs to be sent out of the plurality of the programs stored in the program RAM 41. That is, in the case, for example, where contents of the first to third programs are stored in the program RAM 41 at the addresses from "0" to "28" as shown in FIG. 14 and the first to third programs are to be transferred to the processors 3-1 to 3-n, the start value generator 48a provides the data for the address value "0" and the end value generator 48b provides the data for the address value "28".

And, the start value from the start value generator 48a is supplied to the address counter 42 and the address counter 42 starts counting from this start value. And the counted-value output is supplied to the program RAM 41 as read addresses and also supplied to the microprogram memories of each of the processors 3-1 to 3-n as write addresses ADRS. The program data DATA read out from the RAM 41 are also supplied to the microprogram memories of each of the processors 3-1 to 3-n.

In this case, the microprogram memories of each processor is provided with virtually equal capacity to that of the program RAM 41.

The address data ADRS from the address counter 42 is also supplied to a comparator 44 and therein compared with the end value from the end value generator 48b. From the comparator 44 is output a write signal WR, which is held, for example, at "0" until the address data ADRS sequentially changing from the start value reaches the end value. The write signal is supplied to the write enable terminals of the microprogram memories of each of the processors 3-1 to 3-n, and writing of the program in the memories is enabled while the write enable signal is kept at "0".

In the described manner, the write signal WR is held at "0" while the address data ADRS from the address counter 42 changes from "0" to "28", and during this period of time, the first to third programs written in the program RAM 41 at the addresses "0" to "28", regarded as one program, are sequentially read out from the program RAM 41 and written in the microprogram memories at the addresses according to the address data ADRS.

While the programs are transferred to each of the processors 3-1 to 3-n, execution start addresses CS1 to CSn, i.e., the start addresses of the programs out of the first to third programs to be executed in the next place by each of the processors are supplied from the address RAM 51 individually to each thereof and latched by the registers of each of the processors 3-1 to 3-n. If the example of FIG. 14 is taken up, the execution start address of the first program is "0", the execution start address of the second program is "6", and the execution start address of the third program is "19".

In the event of the program execution to be started by each processor after the transfer has been finished, the program is started at the execution start address, and thus, desired programs can be executed.

If the programs to be executed in the next place are included in the plural programs which have already been transferred, the execution addresses only will be retransferred, and thereby, different programs are enabled to be executed by each of the processors.

By the way, it is possible to individually transfer a plurality of programs, as a lump of program, to each processor, but the transfer can be finished at one time if the programs are simultaneously transferred in the manner as illustrated in FIG. 13.

According to the present invention as described above, a plurality of programs are regarded as one program and transferred at one time and the execution start signals of each of the programs are separately sent, and therefore, the programs requiring plural transfer can be transferred at one time and the transferring time can be reduced.

And, since a plurality of different programs can be transferred to a plurality of processors without requiring a selection control arrangement, the circuit for the transfer becomes smaller in scale.

However, in the case where each of a plurality of processors are supplied with different programs, the number of the programs to be sent in a lump will become the same as the total number of the processors and the transferring time will accordingly become longer. Then, in some case where there are large number of processors, the transferring time as a whole may be reduced if arranged such that the programs of the same number as the number of the processors to which program transfer is to be made are arranged in a lump and this lump of programs is individually transferred to each of the processors in question.

Figure 15:
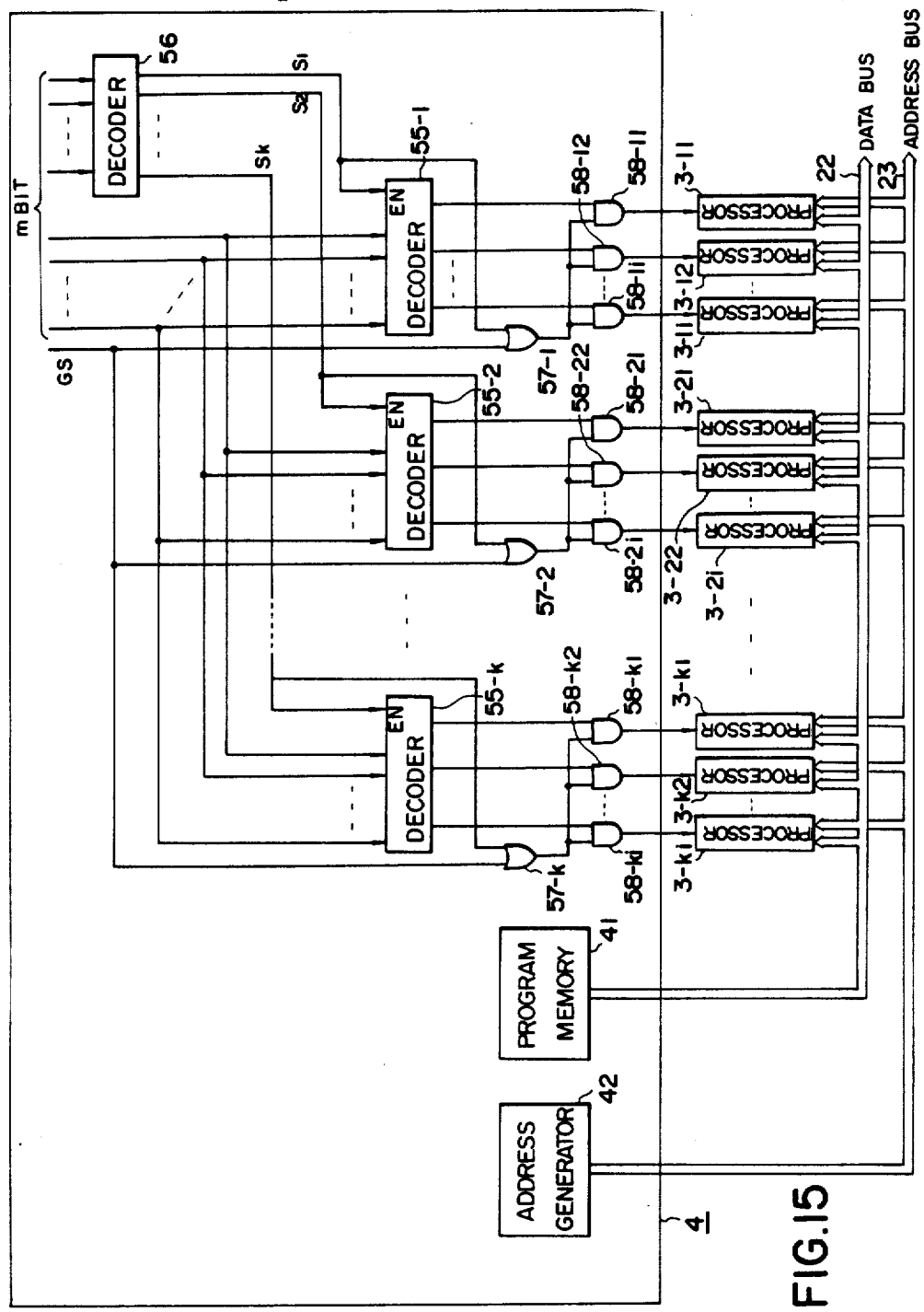
FIGS. 15 and 16 are block diagrams showing other examples of the main portion of the image processing apparatus of FIG. 1.

FIG. 15 shows another embodiment of the apparatus of the present invention. This invention is characterized by the portion in the transferring processor outputting select signals to a plurality of processors.

The plurality of processors are divided in some groups in such a way, for example, that those processors which are possible to perform the same work are put in a group. In the present case, they are divided in k groups, each thereof being formed of i processors, namely, the first group of processors 3-11, 3-12, ..., 3-1$i$, the second group of processors 3-21, 3-22, ..., 3-2, ..., and the k-th group of processors 3-k1, 3-k2, ..., 3-Ki.

The transferring processor 4 is provided with decoders 55-1, 55-2, ..., 55-k for supplying each of the processors of each of the groups with a select signal. These decoders 55-1, 55-2, ..., 55-k are, similar to the decoder 50 in FIG. 2, such that only one select signal therefrom becomes "0" and all the others become "1" according to the input bit thereto, and, as the input data, the lower 1-bit portion of a m-bit select signal is supplied. The higher (m−1)-bit portion of the m-bit select signal is input to a decoder 56. This decoder 56 generates select signals S1, S2, ..., Sk for selecting one out of the decoders 55-1, 55-2, ..., 55-k for each of the groups, and each of the select signals S1, S2, ..., Sk are supplied to enable terminals EN of the decoders 55-1, 55-2, ..., 55-k.

In the present case, m, l, k, and i are so selected as to satisfy $2^l \geq i$ and $2^{m-1} \geq k$.

The select signal is provided with one extra bit so that group-wise selection is made possible. The one-bit signal GS is supplied to one of the input terminals of each of the OR gates 57-1, 57-2, ..., 57-k. The other input terminal of the OR gate 57-1 is supplied with the select signal S1, the other input terminal of the OR gate 57-2 is supplied with the select signal S2, ..., and the other input terminal of the OR gate 57-k is supplied with the select signal Sk.

From each of the decoders 55-1, 55-2, ..., 55-k, i pieces of processor select signals are supplied through each of i pieces of AND gates 58-11 to 58-1$i$, 58-2$l$ to 58-2$i$, ..., 58-k1 to 58-ki, respectively, to each group of processors 3-11 to 3-1$i$, 3-21 to 3-2$i$, ..., 3-k1 to 3-ki, respectively. And, the output of the OR gate 57-1 is commonly supplied to the first group of AND gates 58-11 to 58-1$i$, the output of the OR 57-2 is commonly supplied to the second group of AND gates 58-21 to 58-2$i$, ..., and the output of the OR gate 57-k is commonly supplied to the k-th group of AND gates 58-k1 to 58-ki, respectively.

With the above described structure, sequentially transferring different programs to each of the processors one by one and writing the programs in their respective memories as has hitherto been practiced is carried out in the following manner.

Firstly, the signal GS is brought into the state of "1". Hence, all of the outputs of the OR gates 57-1 to 57-k become "1", and the AND gates 58-11 to 58-ki are all brought into the state of gating the outputs of the decoders 55-1 to 55-k as they are.

Under these conditions, the input select signal is sequentially advanced with one increment each time of the transfer.

In the present case, the input to the decoder 56 is held in an unchanged state until the program transfer to one processor has been finished, namely, held in a state of selecting the decoder of one group.

That is, according to the input select signal, only the select signal S1 first becomes "0", whereby the decoder 55-1 is rendered operative as a decoder, while the processor select signals output from all of the others become "1" regardless of the inputs thereto.

Thus, the first group is selected and the program is sequentially written through a bus in the memories of the processors 3-11 to 3-1$i$ of the first group in accordance with the 1-bit select signal of the decoder 55-1.

When i times of the program transfers to the processors 3-11 to 3-1$i$ of the first group have been finished, the lowest bit of the higher (m−1)-bit input select signal in inverted, whereby only the select signal S2 of the output of the decoder 56 becomes "0" to render the decoder 55-2 operative as a decoder and outputs of all of other decoders 55-1, 55-3 to 55-k become "1". Thus, in like manner, the program is sequentially transferred to the processors of the second group according to the lower 1-bit select signal.

Thereafter, one of the decoders 55-1 to 55-k is likewise rendered operative as a decoder according to the select signal output from the decoder 56, and program transfers are sequentially made i times to i processors of the group of that decoder, and thereby, the program transfers to all of the processors are carried out in sequence.

Next, at the time of group-wise program transfer, the signal GS is turned to "0". Then, the outputs of the OR gates, to which the select signals being "0" out of the select signals S1 to Sk output from the decoder 56 are supplied, become "0". For example, if the signal S1 to "0", the output of the OR gate 57-1 becomes "0", whereby outputs of all of the i AND gates 58-11 to 58-1$c$ of its group become "0" regardless of the select signals output from the decoder 55-1. Thus, the memories of the processors 3-11 to 3-1$i$ of the first group are rendered write enabled, and so, the same program is written in the processors 3-11 to 3-1i of the first group at one time of transfer.

Then, in like manner the, identical program is simultaneously written in i processors of the group selected by one of the select signals S1 to Sk from the decoder 56, at one time of transfer.

Therefore, in the present case, program transfer to all of the k×i processors can be carried out by i times of transfers and the transferring time can thereby be reduced.

Incidentally, instead of transferring programs to all processors in sequence, it is of course possible to transfer the program to any processor or to any group of processors at any desired time by arranging the input select signal to become the data to select that processor or group.

In dividing the processors into some groups, each of the groups need not be formed of the same numbers of processors but may be formed of any number of processors which will use the same program. In such a case, by storing the number of processors belonging to each of the groups in a memory, the loss of time produced when the transfer is sequentially made to each group can be eliminated.

Figure 16:
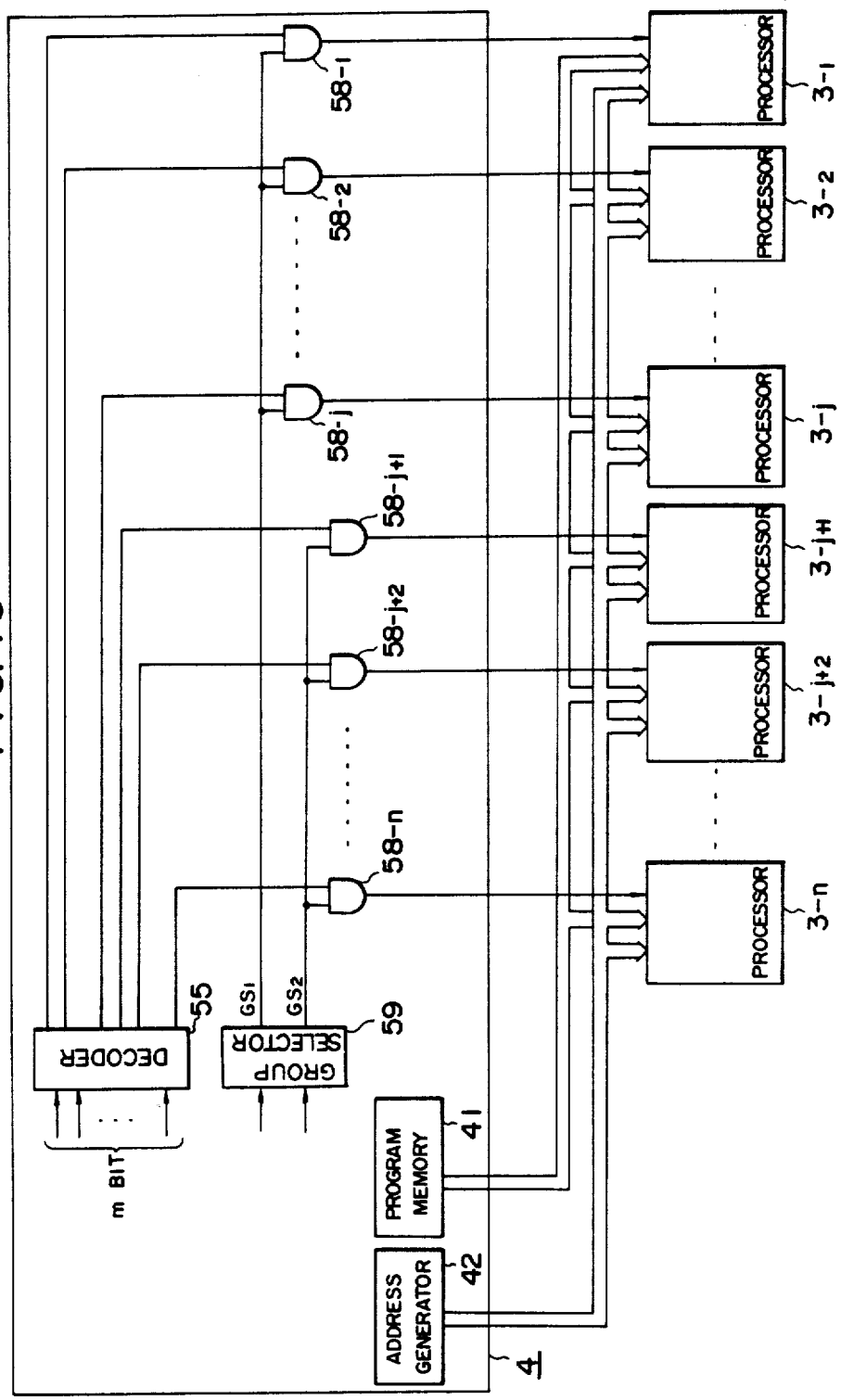

FIG. 16 shows another example of the apparatus of the present invention, which is an improved example of that in FIG. 15 and parts thereof corresponding to the example in FIG. 15 are denoted by the same reference numerals.

In the present example, n processors are divided into a first group including i processors and a second group including (n−i) processors.

In the case of the present example, n select signals from a decoder 55 for selecting n processors are supplied through AND gates 58-1 to 58-n, respectively, to each of the processors 3-1 to 3-n.

There is also provided a group selector circuit 59, to which a two-bit select signal is supplied.

And, a first group select signal GS1 is supplied to first input terminals of the AND gates 58-1 to 58-j—to which the select signals from the decoder 55 for selecting the processors 3-1 to 3-j of the first group are supplied at the other input terminals. And, the second group select signals GS2 is supplied to the first input terminals of AND gates 58-j+1 to 58-n—to which the select signals from the decoder 55 for selecting the processors 3-j+1 to 3-n of the second group are supplied the other input terminals.

In the case where different programs are sequentially transferred to each of the processors one by one the same as hitherto in practice, the group selector circuit 59 is supplied with signals causing both the signals GS1 and GS2 to become "1". Hence, the AND gates 58-1 to 58-n are brought to the state allowing the outputs of the decoder 55 as they are, and thereafter, the sequential transfers to all of the processors are carried out just in the same way as previously described.

Next, if the selector circuit 59 is supplied with such signals that will turn only the signal CS1 to "0", then all of the outputs of the AND gates 58-1 to 58-j become "0" regardless of the output select signals from the decoder 55, and thereby, the same program is simultaneously written in the processors 3-1 to 3-j of the first group at one time of transfer.

And, in the case where only the signal GS2 is turned to "0", the outputs of the AND gates 58-j+1 to 58-n all become "0" regardless of the output select signals from the decoder 55, whereby the identical program is simultaneously written in the processors 3-j+1 to 3-n of the second group at one time of transfer.

If both of the signals GS1 and GS2 are turned to "0", the outputs of the AND gates 58-1 to 58-n all become "0", in which case the identical program can be simultaneously transferred to all of the processors 3-1 to 3-n.

In the present invention, when transferring information to a plurality of processors, information can not only be transferred individually to each of the processors but also simultaneously transferred, at one time of transfer, to a plurality of processors which will use the same information, and so, a reduction in the transferring time can be achieved.

Although the case where the apparatus of the present invention was applied to video signal processing has been described above, it is a matter of course that the present invention is applicable to digital processing of other information signals than the video signal such as the audio signal because a portion of such a signal for the duration of a unit time can be stored in a memory and the signal can be sequentially processed for each of such a unit-time portion.

While the above description has been made with a multiprocessor system taken as an example, the present invention can of course be applied to the case where a single processor is mode controlled.

Further, the above described example has been of the case of transferring microprograms, but as a matter of course the transferable data are not limited to the microprograms.

What is claimed is:

1. An information processing apparatus comprising:
a program supplying portion;
write signal generator means; and
a data processor including a microprogram controller, microprogram memory, arithmetic unit, and selector means for selecting an address from said microprogram controller and an address from said program supplying portion and supplying the selected address to said microprogram memory; and
a manually actuatable mode signal generator for generating mode signals to effectuate a plurality of modes selected by the user of the apparatus, wherein
in response to a first mode signal, said selector means supplies an address from said microprogram controller to said microprogram memory and a program is thereby executed,
in response to a second mode signal, said selector means supplies an address from said microprogram controller to said microprogram memory and said microprogram controller is caused to generate program start addresses, and
in response to a third mode signal, said selector means supplies an address from said program supplying portion to said microprogram memory and in response to a write signal from said write signal generator means fed to said program supplying portion, the program from said program supplying portion is written in the microprogram memory.

2. An information processing apparatus according to claim 1, wherein said mode signal generator comprises switch means manually actuatable by a user of the apparatus, said switch means being connected to a voltage source, and logic means connected to said switch means for producing at least two binary output signals the states of which constitute said first, second, and third mode signals.

3. An information processing apparatus according to claim 1, further comprising a pipeline register connected between an output of said selector and an input of said microprogram memory.

4. An information processing apparatus according to claim 3, further comprising a fast clock signal generator, a slow clock signal generator, and a logic circuit connected to said mode signal generator, said fast clock signal generator and said slow clock signal generator each supplying a respective clock signal to said pipeline register in response to said mode signals.

5. An information processing apparatus according to claim 1 further comprising a register connected to said microprogram memory and to said microprogram controller and in response to said first mode signal an execution start address from the microprogram memory is latched into said register.

6. An information processing apparatus according to claim 5, wherein said register contains a reset code and in response to said second mode signal said register supplies said reset code to said instruction terminal of said microprogram controller.

7. An information processing apparatus according to claim 1 further comprising register means connected between the output of said microprogram memory and the input of said arithmetic unit and connected to said mode signal generator, and a predetermined code generator, said register means being connected to latch an output of said predetermined code generator and to selectively supply said output to the input of the arithmetic unit, whereby in response to said third mode signal said register means blocks the output of the microprogram memory from the arithmetic unit.

* * * * *